(12) United States Patent
Ripley et al.

(10) Patent No.: US 7,386,554 B2
(45) Date of Patent: Jun. 10, 2008

(54) REMOTE SCORING AND AGGREGATING SIMILARITY SEARCH ENGINE FOR USE WITH RELATIONAL DATABASES

(75) Inventors: John R. Ripley, Round Rock, TX (US); Ram Anantha, Cedar Park, TX (US); Charles Moon, Round Rock, TX (US)

(73) Assignee: Infoglide Software Corporation, Austin, TX (US)

( * ) Notice: Subject to any disclaimer, the term of this patent is extended or adjusted under 35 U.S.C. 154(b) by 647 days.

(21) Appl. No.: 10/653,690

(22) Filed: Sep. 2, 2003

(65) Prior Publication Data

US 2004/0078364 A1    Apr. 22, 2004

Related U.S. Application Data

(63) Continuation-in-part of application No. 10/618,840, filed on Jul. 14, 2003.

(60) Provisional application No. 60/407,755, filed on Sep. 3, 2002.

(51) Int. Cl.
*G06F 7/00* (2006.01)
(52) U.S. Cl. .................................................. 707/10
(58) Field of Classification Search .......... 707/1–104.1
See application file for complete search history.

(56) References Cited

U.S. PATENT DOCUMENTS

| | | | | |
|---|---|---|---|---|
| 5,835,755 A | * | 11/1998 | Stellwagen, Jr. ............... 707/3 |
| 5,893,095 A | * | 4/1999 | Jain et al. ....................... 707/6 |
| 5,915,250 A | * | 6/1999 | Jain et al. ..................... 707/100 |
| 5,963,940 A | * | 10/1999 | Liddy et al. .................... 707/5 |
| 5,999,972 A | | 12/1999 | Gish |
| 6,035,055 A | | 3/2000 | Wang et al. |
| 7,181,438 B1 | * | 2/2007 | Szabo ............................ 707/2 |
| 2001/0047276 A1 | * | 11/2001 | Eisenhart ........................ 705/1 |
| 2001/0056405 A1 | * | 12/2001 | Muyres et al. ................. 705/52 |
| 2003/0083891 A1 | * | 5/2003 | Lang et al. ..................... 705/1 |
| 2003/0200175 A1 | * | 10/2003 | Wang et al. ................... 705/50 |

* cited by examiner

*Primary Examiner*—Don Wong
*Assistant Examiner*—Linh Black
(74) *Attorney, Agent, or Firm*—Taylor Russell & Russell, P.C.

(57) ABSTRACT

A system and method for defining a schema and sending a query to a similarity search engine to determine a quantitative assessment of the similarity of attributes between an anchor record and one or more target records. The similarity search engine makes a similarity assessment in a single pass through the target records having multiple relationship characteristics. The similarity search engine is a server configuration that communicates with one or more database management systems for providing data persistence, data retrieval and access to user defined functions. The architecture enables search activities to be segmented among multiple remote database management systems for reducing the time required to perform searches. Implementation provisions include a method by which a secure transport driver may be configured for a datasource and a method by which configuration files may be persisted to either filesystem storage or a relational database.

47 Claims, 27 Drawing Sheets

```
<claim>
    <claimant>
        <name/>
    </claimant>
    <witness>
        <name/>
    </witness>
</claim>
```

FIG. 3

```
<DATASET connection="">
    <EXPRESSION type="table|sql"></EXPRESSION>
    <BIND>
        <DETAIL>
            <NAME></NAME>
            <TYPE></TYPE>
        </DETAIL>
        <MASTER>
            <NAME></NAME>
            <TYPE></TYPE>
        </MASTER>
    </BIND>
    <PATH>
        <FIELD>
            <NAME></NAME>
            <TYPE></TYPE>
        </FIELD>
    </PATH>
    <CHILDDATASET/>
</DATASET>
```

FIG. 4

```
<SCHEMA name="">
    <STRUCTURE/>
    <SEMANTICS/>
    <COMPATIBLE/>
    <MAPPING implementation="">
        <DATASET datasource="">
            <EXPRESSION></EXPRESSION>
            <BIND>
                <DETAIL>
                    <NAME></NAME>
                    <TYPE></TYPE>
                </DETAIL>
            </BIND>
            <PATH></PATH>
            <FIELD pkey="true">
                <NAME></NAME>
                <TYPE></TYPE>
                <PATH></PATH>
            </FIELD>
            <CHILDDATASET/>
        </DATASET>
    </MAPPING>
</SCHEMA>
```

FIG. 5

| PKEY | NAME_FIRST | NAME_MIDDLE | NAME_LAST |
|---|---|---|---|
| 627 | BENJAMIN | | BENDER |
| 641 | BRIAN | K | HOSKINS |
| 1131 | BRYAN | | DELANCEY |
| 1242 | BRIAN | | BAILEY |
| 1480 | BENJAMIN | | STAMM |
| 1674 | BRIAN | J | GRUND |
| 1792 | BEN | F | NERY |
| 1885 | BRIAN | | PRUCKER |
| 2895 | BRIAN | | ABBOTT |
| 3283 | BURTON | | TOBEY |
| 3303 | BRIAN | H | WALLIS |
| 3538 | BNEJAMIN | J | SELLORS |
| 3713 | BENJAMIN | | MOBLEY |
| 3731 | BRIAN | E | LADD |
| 3782 | BRIAN | | GODEAUX |
| 3869 | BROOKS-HARMON | | BLAIR |
| 4007 | BRIAN | | CLARK |

FIG. 6

| PKEY | ADDRESS | CITY | STATE |
|---|---|---|---|
| 627 | 13588 VIA FLORA | DELRAY BEACH | FL |
| 641 | 1901 WESTMORELAND BLVD | PORT ST. LUCIE | FL |
| 1131 | | | |
| 1242 | 108 ELLERBE RD | ROCKINGHAM | NC |
| 1480 | 2503 COG HILL LN | LAS VEGAS | NV |
| 1674 | 10121 ROVEOUT LN | COLUMBIA | MD |
| 1792 | 4935 PALIN ST | SAN DIEGO | CA |
| 1885 | 1127 TOLLAND TURNPIKE | MANCHESTER | CT |
| 2895 | 20 BUTLER PLACE | BROOKLYN | NY |
| 3283 | 6509 GOLDEN PL | TAMPA | FL |
| 3303 | 531 HALL CT | HAVRE DE GRACE | MD |
| 3538 | 10184 CLIFF MILLS RD | MARSHALL | VA |
| 3713 | 704 HUMINGBIRD | KILLEEN | TX |
| 3731 | 1089 GLENWOOD STREET | DUNEDIN | FL |
| 3782 | 4605 S INDEPENDENCE | LITTONTON | CO |
| 3869 | 1335 WIKIUP DR | SANTA ROSA | CA |
| 4007 | 820 DIXIE AVE NE | ATLANTA | GA |

FIG. 7

| PKEY | NAME_FIRST | NAME_MIDDLE | NAME_LAST | ADDRESS | CITY | STATE |
|---|---|---|---|---|---|---|
| 627 | BENJAMIN | | BENDER | 13588 VIA FLORA | DELRAY BEACH | FL |
| 641 | BRIAN | K | HOSKINS | 1901 WESTMORELAND BLVD | PORT ST. LUCIE | FL |
| 1131 | BRYAN | | DELANCEY | | | |
| 1242 | BRIAN | | BAILEY | 108 ELLERBE RD | ROCKINGHAM | NC |
| 1480 | BENJAMIN | | STAMM | 2503 COG HILL LN | LAS VEGAS | NV |
| 1674 | BRIAN | J | GRUND | 10121 ROVEOUT LN | COLUMBIA | MD |
| 1792 | BEN | F | NERY | 4935 PALIN ST | SAN DIEGO | CA |
| 1885 | BRIAN | | PRUCKER | 1127 TOLLAND TURNPIKE | MANCHESTER | CT |
| 2895 | BRIAN | | ABBOTT | 20 BUTLER PLACE | BROOKLYN | NY |
| 3283 | BURTON | | TOBEY | 6509 GOLDEN PL | TAMPA | FL |
| 3303 | BRIAN | H | WALLIS | 531 HALL CT | HAVRE DE GRACE | MD |
| 3538 | BNEJAMIN | J | SELLORS | 10184 CLIFF MILLS RD | MARSHALL | VA |
| 3713 | BENJAMIN | | MOBLEY | 704 HUMINGBIRD | KILLEEN | TX |
| 3731 | BRIAN | E | LADD | 1089 GLENWOOD STREET | DUNEDIN | FL |
| 3782 | BRIAN | | GODEAUX | 4605 S INDEPENDENCE | LITTONTON | CO |
| 3869 | BROOKS-HARMON | | BLAIR | 1335 WIKIUP DR | SANTA ROSA | CA |
| 4007 | BRIAN | | CLARK | 820 DIXIE AVE NE | ATLANTA | GA |

FIG. 8

| PKEY | NAME_FIRST | NAME_MIDDLE | NAME_LAST |
|---|---|---|---|
| 627 | benjamin | | bender |
| 641 | brian | k | hoskins |
| 1131 | bryan | | delancey |
| 1242 | brian | | bailey |
| 1480 | benjamin | | stamm |
| 1674 | brian | j | grund |
| 1792 | ben | f | nery |
| 1885 | brian | | prucker |
| 2895 | brian | | abbott |
| 3283 | burton | | tobey |
| 3303 | brian | h | wallis |
| 3538 | bnejamin | j | sellors |
| 3713 | benjamin | | mobley |
| 3731 | brian | e | ladd |
| 3782 | brian | | godeaux |
| 3869 | brooks-harmon | | blair |
| 4007 | brian | | clark |

FIG. 9

| PKEY | NAME_FIRST |
|---|---|
| 627 | 0.240740746259689 |
| 641 | 1 |
| 1131 | 0.800000011920929 |
| 1242 | 1 |
| 1480 | 0.240740746259689 |
| 1674 | 1 |
| 1792 | 0.541666686534882 |
| 1885 | 1 |
| 2895 | 1 |
| 3283 | 0.550000011920929 |
| 3303 | 1 |
| 3538 | 0.240740746259689 |
| 3713 | 0.240740746259689 |
| 3731 | 1 |
| 3782 | 1 |
| 3869 | 0.195121943950653 |
| 4007 | 1 |

FIG. 10

| FUNCTION | PURPOSE |
|---|---|
| NAMEDIFF | Measures name and name parts and understands the difference between first and last names and nicknames |
| SOUNDEX | Measure how close two name "sound" |
| STRDIFF | Measure how close two strings are using character transpositions and character noise and white space. |

FIG. 14

| FUNCTION | PURPOSE |
|---|---|
| STREETDIFF | Measure the closeness of two string which represent street addresses and understands apt. designations along with street type, direction, and abbreviations |
| CITY | Measures how close two cities are by both using spelling and considering physical distance using suburbs lookups |
| ZIP | Measures physical distance of two ZIP codes |

FIG. 15

| PKEY | NAME_FIRST | SCORE 1 | NAME_LAST | SCORE 2 |
|---|---|---|---|---|
| 627 | BENJAMIN | 0.653124988079071 | BENDER | 0.474999994039536 |
| 641 | BRIAN | 1 | HOSKINS | 0.125 |
| 1131 | BRYAN | 0.949999988079071 | DELANCEY | 0.474999994039536 |
| 1242 | BRIAN | 1 | BAILEY | 0.949999988079071 |
| 1480 | BENJAMIN | 0.653124988079071 | STAMM | 0.157894730567932 |
| 1674 | BRIAN | 1 | GRUND | 0.00999999977648258 |
| 1792 | BEN | 0.759999990463257 | NERY | 0.1875 |
| 1885 | BRIAN | 1 | PRUCKER | 0.00999999977648258 |
| 2895 | BRIAN | 1 | ABBOTT | 0.260869562625885 |
| 3283 | BURTON | 0.814285695552826 | TOBEY | 0.416666656732559 |
| 3303 | BRIAN | 1 | WALLIS | 0.474999994039536 |
| 3538 | BNEJAMIN | 0.653124988079071 | SELLORS | 0.474999994039536 |
| 3713 | BENJAMIN | 0.653124988079071 | MOBLEY | 0.666666686534882 |
| 3731 | BRIAN | 1 | LADD | 0.210526317358017 |
| 3782 | BRIAN | 1 | GODEAUX | 0.00999999977648258 |
| 3869 | BROOKS-HARMON | 0.569999992847443 | BLAIR | 0.855000019073486 |
| 4007 | BRIAN | 1 | CLARK | 0.474999994039536 |

FIG. 16

| PKEY | SCORE 1 | SCORE 2 | SCORE 3 | SCORE 4 |
|---|---|---|---|---|
| 627 | 1 | 0.309523820877075 | 0.109375 | 0.102564103901386 |
| 641 | 0.653124988079071 | 0.15384615957737 | 0.233333334326744 | 0.009999999776482 |
| 1131 | 0.653124988079071 | 0.0925925895571709 | 0 | 0 |
| 1242 | 0.653124988079071 | 0.119047619402409 | 0.224999994039536 | 0.111111111938653 |
| 1480 | 1 | 0.157894730567932 | 0.157142862677574 | 0.0892857164144516 |
| 1674 | 0.653124988079071 | 0.009999999776482 | 0.144067794084549 | 0.133333340287209 |
| 1792 | 0.746428549289703 | 0.458333343267441 | 0.163934424519539 | 0.111111111938653 |
| 1885 | 0.653124988079071 | 0.125 | 0.197368428111076 | 0.0909090936183929 |
| 2895 | 0.653124988079071 | 0.474999994039536 | 0.161764711141586 | 0.270833343267441 |
| 3283 | 0.474999994039536 | 1 | 0.1076923808723927 | 0.009999999776482 |
| 3303 | 0.653124988079071 | 0.009999999776482 | 0.119402982294559 | 0.095238097012043 |
| 3538 | 1 | 0.10416666418314 | 0.242647051811218 | 0.009999999776482 |
| 3713 | 1 | 0.75 | 0.841666695455811 | 0.958333313465118 |
| 3731 | 0.653124988079071 | 0.009999999776482 | 0.243243247270584 | 0.275000005960464 |
| 3782 | 0.653124988079071 | 0.307692319154739 | 0.383928567171097 | 0.600000023841858 |
| 3869 | 0.514583349227905 | 0.138888895511627 | 0.141666665673256 | 0.009999999776482 |
| 4007 | 0.653124988079071 | 0.009999999776482 | 0.161764711141586 | 0.269230782985687 |

FIG. 17

| PKEY | NAME_FIRST | NAME_MIDDLE | NAME_LAST |
|---|---|---|---|
| 12 | JOHNNIE | L | SINKFIELD |
| 15 | JOHNNIE | L | SINKFIELD |
| 17 | JOHNNIE | L | SINKFIELD |
| 28 | JOHNNIE | L | SINKFIELD |
| 33 | JEAN | M | BUTLER |
| 147 | JOAN | | SELEFKY |
| 291 | JOHN | | SMITH |
| 303 | JUNE | R | MORRISON |
| 304 | JEANNE | | VADALA |
| 358 | JOAN | | WINESTOCK |
| 372 | JOHN | | BISSMAN |
| 373 | JOHN | | BISSMAN |
| 375 | JOHN | | BISSMAN |
| 395 | JOANNE | | SONTAG |
| 398 | JUNE | C | FRIEDEL |
| 399 | JUNE | C | FRIEDEL |
| 407 | JOHN | | SHIVE |

FIG. 18

| PKEY | 2 | 3 |
|---|---|---|
| 12 | 0.949999988079071 | 0.580555558204651 |
| 15 | 0.949999988079071 | 0.580555558204651 |
| 17 | 0.949999988079071 | 0.580555558204651 |
| 28 | 0.949999988079071 | 0.580555558204651 |
| 33 | 0.949999988079071 | 0.395833313465118 |
| 147 | 0.949999988079071 | 0.316666662693024 |
| 291 | 1 | |
| 303 | 0.949999988079071 | 0.107142858207226 |
| 304 | 0.949999988079071 | 0.395833313465118 |
| 358 | 0.949999988079071 | 0.527777791023254 |
| 372 | 1 | 0.289473682641983 |
| 373 | 1 | 0.289473682641983 |
| 375 | 1 | 0.289473682641983 |
| 395 | 0.949999988079071 | 0.882142841815948 |
| 398 | 0.949999988079071 | 0.316666662693024 |
| 399 | 0.949999988079071 | 0.316666662693024 |
| 407 | 1 | 0.474999994039536 |

FIG. 19

| PKEY | NAME_FIRST | NAME_MIDDLE | NAME_LAST |
|---|---|---|---|
| 850551 | LORRAINE | A | RIDGLEY |
| 850554 | LORRAINE | | RIDGLEY |
| 850558 | LORRAINE | A | RIDGLEY |
| 850559 | JERQALD | | RIDGLEY |
| 875808 | DEBBY | | RIDGLEY |
| 901407 | JAMES | | RIDGLEY |
| 901415 | JAMES | E | RIDGLEY |
| 901417 | JAMES | E | RIDGLEY |
| 1704 | BEATRICE | | RILEY |
| 4171 | GEORGE | M | RILEY |
| 8653 | ARETHA | L | RILEY |
| 8659 | LYTANYA | A | RILEY |
| 13438 | VICTORIA | | RILEY |
| 13440 | ROBERT | | RILEY |
| 20982 | JIMMIE | M | RILEY |

FIG. 20

| PKEY | OVERALL |
|---|---|
| 627 | 0.5640624910159303 |
| 641 | 0.5625 |
| 1131 | 0.7124999910159303 |
| 1242 | 0.9749999940139536 |
| 1480 | 0.4055098593232502 |
| 1674 | 0.5049999998888241 |
| 1792 | 0.4737499995231628 |
| 1885 | 0.5049999998888241 |
| 2895 | 0.6304347781312943 |
| 3283 | 0.6154761761742693 |
| 3303 | 0.7374999970197168 |
| 3538 | 0.5640624910159303 |
| 3713 | 0.6598958373069766 |
| 3731 | 0.6052631586790008 |
| 3782 | 0.5049999998888241 |
| 3869 | 0.7125000059604644 |
| 4007 | 0.7374999970197168 |

FIG. 21

| PKEY | OVERALL |
|---|---|
| 627 | 0.5195312425499419 |
| 641 | 0.34375 |
| 1131 | 0.5937499925499419 |
| 1242 | 0.9624999910159303 |
| 1480 | 0.2817022949457717 |
| 1674 | 0.2574999998322362 |
| 1792 | 0.3306249976158144 |
| 1885 | 0.2574999998322362 |
| 2895 | 0.4456521719694142 |
| 3283 | 0.5160714164376266 |
| 3303 | 0.6062499955296522 |
| 3538 | 0.5195312425499419 |
| 3713 | 0.6632812619209298 |
| 3731 | 0.4078947380185139 |
| 3782 | 0.2574999998322362 |
| 3869 | 0.7837500125169754 |
| 4007 | 0.6062499955296522 |

FIG. 22

| PKEY | 2 | 3 | 4 | 5 | 6 |
|---|---|---|---|---|---|
| 8 | 0.125 | 0.159999964237211 | 0.239130437374115 | 0.009999999776492 | 0.534375011920929 |
| 9 | 0 | 0 | 0 | 0 | 0 |
| 10 | 0.300000011920929 | 0.181818187236786 | 0.316666662693024 | 0.474999994039536 | 0.237499997019768 |
| 11 | 0.240740746259689 | 0.009999999776492 | 0.237499997019768 | 0.474999994039536 | 0.522499978542328 |
| 12 | 0.240740746259689 | 0.009999999776492 | 0.237499997019768 | 0.474999994039536 | 0.522499978542328 |
| 13 | 0.240740746259689 | 0.009999999776492 | 0.237499997019768 | 0.474999994039536 | 0.522499978542328 |
| 14 | 0.395833313465118 | 0.009999999776492 | 0.395833313465118 | 0.356249988079071 | 0.316666662693024 |
| 15 | 0.240740746259689 | 0.009999999776492 | 0.237499997019768 | 0.474999994039536 | 0.522499978542328 |
| 16 | 0 | 0 | 0 | 0 | 0 |
| 17 | 0.240740746259689 | 0.009999999776492 | 0.237499997019768 | 0.474999994039536 | 0.522499978542328 |
| 18 | 0.009999999776492 | 0.009999999776492 | 0.316666662693024 | 0.474999994039536 | 0.237499997019768 |
| 102919 | 0 | 0 | 0 | 0 | 0 |
| 19 | 0.150000005960464 | 0.009999999776492 | 0.316666662693024 | 0.474999994039536 | 0.237499997019768 |
| 20 | 0.240740746259689 | 0.009999999776492 | 0.237499997019768 | 0.474999994039536 | 0.522499978542328 |
| 21 | 0 | 0 | 0 | 0 | 0 |
| 22 | 0 | 0 | 0 | 0 | 0 |

FIG. 23

| "MEASURE" // METHOD | DESCRIPTION |
|---|---|
| "looks_like" // string_diff() | A strongly left-to-right biased general string comparison function that returns a score of from 0.0 to 1.0. |
| "spelled_like" // CompareEditDistance() | A non-biased general string comparison function that returns a score of from 0.0 to 1.0. |
| "sounds_like" // CompareSoundex() | Finds and groups family names that are variations on a root name spelling. |
| "exact" // CompareExact() | Exact, but case-sensitive comparison with boolean-style return. |
| "near" // CompareDigitStrings() | A smart, lexical comparison of strings known to contain digits, which compensates for typographical errors by using weighting. |
| "numeric" // CompareNumeric() | A numeric comparison of strings known to contain all digits, returning a fractional score value. |
| "date" // CompareDate() | Provides a "proximity comparison of dates that returns a score of from 0.0 to 1.0. |
| "time" // CompareTime() | Provides a "proximity" comparison for times for a range of interest of less than two hours. |
| "name" // CompareNames() | Provides a tokenized comparison specifically for personal names. Last name is weighted most heavily, then first, then middle. |
| "telephone" // ComparePhoneNumbers() | Provides a tokenized comparison specifically for telephone numbers. Area code and exchange are weighted most heavily. |
| "state" // CompareStates() | Provides a smart comparison for U.S. states. Checks standard state abbreviations and maps them to their full name. |
| "street_address" // CompareStreetAddress() | Provides a tokenized comparison specifically for street addresses. Street name weighted most heavily, then number, apartment, type. |
| "email" // CompareEmail() | Provides tokenized comparison specifically for email addresses. Name weighted most heavily, then extra, domain, high domain. |
| "url" // CompareURL() | Provides a tokenized comparison specifically for URL addresses. Domain weighted most heavily, then extra, high domain, www. |
| "ip_address" // CompareDottedIP() | Provides a tokenized comparison specifically for IP addresses. Group1 weighted most heavily, then group2, group3, group4. |
| "vin" // CompareVIN() | Provides a tokenized comparison for Vehicle ID Numbers. Group4 weighted most heavily, then group1, group2, group3. |
| "vehicle_tag" // CompareVehicleTag() | Provides a simple comparison for Vehicle Tags. |
| "federal_id_number" // CompareFIN() | Provides a simple comparison for Federal ID Numbers. |
| "credit_card" // CompareCreditCard() | Provides a simple comparison for Credit Card Numbers. |
| "drivers_license" // CompareDLnumber() | Provides a simple comparison for Drivers License Numbers. |
| "ssn" // CompareSSN() | Provides a tokenized comparison for Social Security numbers. |

FIG. 24A

| "MEASURE" // METHOD | DESCRIPTION |
|---|---|
| "less_than" // CompareLessThan() | Provides a boolean-type comparison for any two strings. The strings may be compared numerically or lexically. |
| "less_than_equal" // CompareLessThanEqual() | Provides a boolean-type comparison for two strings. The strings may be compared numerically or lexically. |
| "greater_than" // CompareGreaterThan() | Provides a boolean-type comparison for two strings. The strings may be compared numerically or lexically. |
| "greater_than_equal" // CompareGreaterThanEqual() | Provides a boolean-type comparison for two strings. The strings may be compared numerically or lexically. |
| "metaphone" // CompareMetaphone() | Provides groupings of differently, yet correctly spelled names. May be used to provide phonetic comparisons. |
| "phonex" // ComparePhonex() | Provides phonetic comparisons. |
| "contains" // ContainsString() | Provides a boolean-type test for sub-string inclusion. |
| "starts_with" // BeginsWith() | Provides a boolean-type test for sub-string inclusion. |
| "ends_with" // EndsWith() | Provides a boolean-type test for sub-string inclusion. |
| "pattern" // ContainsPattern() | Provides a boolean-type test for sub-string inclusion. |

FIG. 24B

```
<DATASOURCE implementation="implementation" name="SecureDatasource">
    <URL>url</URL>
    <USERNAME>user</USERNAME>
    <PASSWORD>password</PASSWORD>
    <DRIVER>driver</DRIVER>
</DATASOURCE>
``` where: *implementation* is the object that implements the interface for this datasource
- *name*     is a name for this instance of the datasource
- *url*     is the universal resource locator consisting of these elements
  - location of the datasource
  - rdbname of the database
  - ssl enablement
  - ca_cert_fingerprint for the connection's client certificate
  - server_cert_fingerprint for the connection's client certificate
- *user*     is the username provided to the database for access by the SSE
- *password*     is the password associated with the username
- *driver*     is the selection of the protocol driver (SSL)

FIG. 26

```
<DATASOURCE implementation="com.infoglide.vdm.RelationalDatasource"
name="SecureDatasource">

<URL>jdbc:db2://localhost:30000;rdbname=LONGLIFE;ssl=yes;ca_cert_fingerpr
int=fcb4a6098241
    4b077297553d0aedd291;server_cert_fingerprint=48a26fc9218d32ce484fd80798
797b1cb</URL>
    <USERNAME>db2admin</USERNAME>
    <PASSWORD>!desodfk8</PASSWORD>
    <DRIVER>hit.db2.Db2Driver</DRIVER>
</DATASOURCE>
```

FIG. 27

```
<PERSISTENCE implementation="implementation">
    <LOCATION>path</LOCATION>
</PERSISTENCE>
``` where *implementation* is the object that implements the interface for this driver
     *path*        is the pathname of the filesystem node used for persistence

FIG. 28

```
<PERSISTENCE implementation="implementation">
    <URL>url</URL>
    <DRIVER>driver</DRIVER>
    <USERNAME>username</USERNAME>
    <PASSWORD>password</PASSWORD>
    <TABLE>tablename</TABLE>
</PERSISTENCE>
``` where *implementation* is the object that implements the interface for this driver
    *driver*     is the name of the driver for the persistence database
    *username*  is the username for access to the persistence database
    *password*  is the password associated with the username
    *tablename* is the database table to be used for persistence
                  (This table must include PATH and VALUE columns)

FIG. 29

```
<PERSISTENCE implementation="com.infoglide.persistence.drivers.FilesystemDriver"
    <LOCATION>D:\playground\DEVL\SSE-DIST\persistence\p1</LOCATION>
</PERSISTENCE>
```

FIG. 30

```
<PERSISTENCE implementation="com.infoglide.persistence.drivers.DBDriver" >
    <URL>jdbc:interbase://localhost/d:/playground/DEVL/PERSISTENCE</URL>
    <DRIVER>interbase.interclient.Driver</DRIVER>
    <USERNAME>SYSDBA</USERNAME>
    <PASSWORD>masterkey</PASSWORD>
    <TABLE>IG_CONFIG</TABLE>
</PERSISTENCE>
```

FIG. 31

```
<PERSISTENCE implementation="com.infoglide.persistence.drivers.CompositeDriver">
    <PERSISTENCE regex="/p1data/.*"
implementation="com.infoglide.persistence.drivers.FilesystemDriver">
        <LOCATION>D:\playground\DEVL\SSE-
        DIST\persistence\p1</LOCATION
    </PERSISTENCE>
    <PERSISTENCE regex="/p2data/.*"
implementation="com.infoglide.persistence.drivers.FilesystemDriver">
        <LOCATION>D:\playground\DEVL\SSE-
        DIST\persistence\p2</LOCATION>
    </PERSISTENCE>
    <PERSISTENCE regex="/p3data/.*"
implementation="com.infoglide.persistence.drivers.FilesystemDriver">
        <LOCATION>D:\playground\DEVL\SSE-
        DIST\persistence\p3</LOCATION>
    </PERSISTENCE>
</PERSISTENCE>
```

FIG. 32

```
<PERSISTENCE
implementation="com.infoglide.persistence.drivers.PathPrependingDriver"
path="/TESTS" >
    <PERSISTENCE implementation=
    "com.infoglide.persistence.drivers.FilesystemDriver">
        <LOCATION>D:\playground\DEVL\SSE-
        DIST\persistence\p1</LOCATION>
    </PERSISTENCE>
</PERSISTENCE>
```

FIG. 33

```
<PERSISTENCE
implementation="com.infoglide.persistence.drivers.KeywordReplacingDriver">
    <KEYWORD key="USER" value="users"/>
    <KEYWORD key="TEMPLATE" value="templates"/>
</PERSISTENCE>
```

Gateway.xml:

```xml
<PERSISTENCE
implementation="com.infoglide.persistence.drivers.KeywordReplacingDriver">
      <KEYWORD key="USER" value="users"/>
      <KEYWORD key="TEMPLATE" value="templates"/>
      <PERSISTENCE implementation="com.infoglide.persistence.drivers.DBDriver" >
            <URL>jdbc:db2:PERSIST</URL>
            <DRIVER>COM.ibm.db2.jdbc.app.DB2Driver</DRIVER>
            <USERNAME>administrator</USERNAME>
            <PASSWORD>jijiwf</PASSWORD>
            <TABLE>IG_CONFIGURE</TABLE>
      </PERSISTENCE>
</PERSISTENCE>
```

FIG. 36

Sse.xml:

```xml
<PERSISTENCE
implementation="com.infoglide.persistence.drivers.KeywordReplacingDriver">
    <KEYWORD key="MEASURE" value="measures"/>
    <KEYWORD key="CHOICE" value="choices"/>
    <KEYWORD key="PARSER" value="parsers"/>
    <KEYWORD key="DATASOURCE" value="datasources"/>
    <KEYWORD key="SCHEMA" value="schemas"/>
    <KEYWORD key="STATISTIC" value="statistics"/>
          <PERSISTENCE
implementation="com.infoglide.persistence.drivers.DBDriver" >
                <URL>jdbc:db2:PERSIST</URL>
                <DRIVER>COM.ibm.db2.jdbc.app.DB2Driver</DRIVER>
                <USERNAME>administrator</USERNAME>
                <PASSWORD></PASSWORD>
                <TABLE>IG_CONFIGURE</TABLE>
          </PERSISTENCE>
    </PERSISTENCE>
```

FIG. 37

Vdm.xml:

```
<PERSISTENCE
implementation="com.infoglide.persistence.drivers.KeywordReplacingDriver">
        <KEYWORD key="DATATYPE" value="datatypes"/>
        <KEYWORD key="DATASOURCE" value="datasources"/>
        <KEYWORD key="SCHEMA" value="schemas"/>
        <PERSISTENCE implementation="com.infoglide.persistence.drivers.DBDriver" >
                <URL>jdbc:db2:PERSIST</URL>
                <DRIVER>COM.ibm.db2.jdbc.app.DB2Driver</DRIVER>
                <USERNAME>administrator</USERNAME>
                <PASSWORD>ljheaerf9u</PASSWORD>
                <TABLE>IG_CONFIGURE</TABLE>
        </PERSISTENCE>
</PERSISTENCE>
```

REMOTE SCORING AND AGGREGATING SIMILARITY SEARCH ENGINE FOR USE WITH RELATIONAL DATABASES

This application is a continuation-in-part of U.S. Provisional Application 60/407,755 filed on Sep. 3, 2002, and is a continuation-in-part of U.S. application Ser. No. 10/618,840 filed on Jul. 14, 2003.

BACKGROUND

The invention relates generally to the field of search engines for use with large enterprise databases. More particularly, the present invention is a similarity search engine that, when combined with one or more relational databases, gives users a powerful set of standard database tools as well as a rich collection of proprietary similarity measurement processes that enable similarity determinations between an anchor record and target database records.

Information resources often contain large amounts of information that may be useful only if there exists the capability to segment the information into manageable and meaningful packets. Database technology provides adequate means for identifying and exactly matching disparate data records to provide a binary output indicative of a match. However, in many cases, users wish to determine a quantitative measure of similarity between an anchor record and target database records based on a broadly defined search criteria. This is particularly true in the case where the target records may be incomplete, contain errors, or are inaccurate. It is also sometimes useful to be able to narrow the number of possibilities for producing irrelevant matches reported by database searching programs. Traditional search methods that make use of exact, partial and range retrieval paradigms do not satisfy the content-based retrieval requirements of many users. This has led to the development of similarity search engines.

Similarity search engines have been developed to satisfy the requirement for a content-based search capability that is able to provide a quantitative assessment of the similarity between an anchor record and multiple target records. The basis for many of these similarity search engines is a comparison of an anchor record band or string of data with target record bands or strings of data that are compared serially and in a sequential fashion. For example, an anchor record band may be compared with target record band #1, then target record band #2, etc., until a complete set of target record bands have been searched and a similarity score computed. The anchor record bands and each target record band contain attributes of a complete record band of a particular matter, such as an individual. For example, each record band may contain attributes comprising a named individual, address, social security number, driver's license number, and other information related to the named individual. As the anchor record band is compared with a target record band, the attributes within each record band are serially compared, such as name-name, address-address, number-number, etc. In this serial-sequential fashion, a complete set of target record bands are compared to an anchor record band to determine similarity with the anchor record band by computing similarity scores for each attribute within a record band and for each record band. Although it may be fast, there are a number of disadvantages to this "band" approach for determining a quantitative measure of similarity.

Using a "band" approach in determining similarity, if one attribute of a target record band becomes misaligned with the anchor record band, the remaining record comparisons may result in erroneous similarity scores, since each record attribute is determined relative to the previous record attribute. This becomes particularly troublesome when confronted with large enterprise databases that inevitably will produce an error, necessitating starting the scoring process anew. Another disadvantage of the "band" approach is that handling large relational databases containing multiple relationships may become quite cumbersome, slowing the scoring process. Furthermore, this approach often requires a multi-pass operation to fully process a large database. Oftentimes, these existing similarity search engines may only run under a single operating system.

There is a need for a similarity search engine that provides a system and method for determining a quantitative measure of similarity in a single pass between an anchor record and a set of multiple target records that have multiple relationship characteristics. It should be capable of operating under various operating systems in a multi-processing environment. It should have the capability to similarity search large enterprise databases without the requirement to start over again when an error is encountered. There is a need for a similarity search engine that provides remote scoring and aggregation within one or more data base management systems remote from a search manager for improved network performance, data base management system performance and overall similarity search engine performance. The connection between the similarity search engine and the remote database management systems should be secure. The similarity search engine should be able to employ persistent storage for data structures essential to operation.

SUMMARY

The present invention of a Remote Scoring and Aggregating Similarity Search Engine (SSE) for use with one or more relational databases is a system and method for determining a quantitative assessment of the similarity between an anchor record and a set of one or more target records. It makes a similarity assessment in a single pass through the target records having multiple relationship characteristics. It is capable of running under various operating systems in a multi-processing environment and operates in an error-tolerant fashion with large enterprise databases. By providing remote scoring and aggregating within the databases, improved database, network and overall similarity search engine performance are achieved over prior SSE, including the parent provisional application 60/356,812 of this continuation-in-part application. The U.S. Provisional Application 60/356,812, filed on Feb. 14, 2002 in incorporated herein by reference.

The present invention comprises a set of robust, multi-threaded components that provide a system and method for similarity scoring, aggregating and ranking attributes of database documents defined by Extensible Markup Language (XML) documents. This search engine uses a unique command syntax known as the XML Command Language (XCL). At the individual attribute level, similarity is quantified as a score having a value of between 0.00 and 1.00 that results from the comparison of an anchor value (search criterion) vs. a target value (database field) using a distance function. At the document or record level, which comprises one or more attributes, similarity is value normalized to a score value of between 0.00 and 1.00 for the document or record. The example of Table 1 illustrates the interrelationships between attributes, anchor values, target values, distance functions and scores.

TABLE 1

| ATTRIBUTE | ANCHOR VALUE | TARGET VALUE | DISTANCE FUNCTION | SCORE |
|---|---|---|---|---|
| Name | John | Jon | StringDifference | 0.75 |
| City | Austin | Round Rock | GeoDistance | 0.95 |
| Shirt Color | Navy | Dark Blue | SynonymCompare | 1.00 |

In the above example, all attributes being weighted equally, the anchor document would compare at 0.90 vs. the target document. Although the example demonstrates the use of weighted average in determining individual scores, it is one of many possible implementations that may be implemented.

This Similarity Search Engine (SSE) architecture is a server configuration comprising a Gateway, a Virtual Document Manager (VDM), a Search Manager (SM) and one or more SQL Databases. The SSE server may serve one or more clients. The Gateway provides command and response routing as well as user management. It accepts commands from the client and routes those commands to either the VDM or the SM. The purpose of the VDM is XML document generation, and the purpose of the SM is generating Structured Query Language (SQL) request from client queries and managing the search processes. The Database Management System (DBMS) performs document searching, document attribute scoring and document score aggregation. The VDM and the SM each receive commands from the Gateway and in turn make calls to the SQL Database. The SQL Database provides data persistence, data retrieval and access to User Defined Functions (UDFs). The Gateway, VDM and SM are specializations of a unique generic architecture referred to as the XML Command Framework (XCF), which handles the details of threading, distribution, communication, resource management and general command handling.

There are several system objects that the SSE relies on extensively for its operation. These include a Datasource object, a Schema object, a Query object and a Measure object. A Datasource object is a logical connection to a data store, such as a relational database, and it manages the physical connection to the data store. A Schema object, central to SSE operation, is a structural definition of a document with additional markup to provide database mapping and similarity definitions. A Query object is a command that dictates which elements of a database underlying a Schema object should be searched, their search criteria, the similarity measures to be used and which results should be considered in the final output. A Measure object is a function that operates on two strings and returns a similarity score indicative of the degree of similarity between the two strings. These Measure objects are implemented as User Defined Functions (UDFs).

Significant improvements in search performance may be achieved by constructing UDFs for implementation in the SQL databases that provide remote document scoring and aggregation within the SQL databases. Previous systems issued an SQL command to the DBMS for each comparison of document attributes involved in a search. Thus, a search with 10 attribute anchor values resulted in 10 database transactions, each requiring the DBMS to schedule the request, parse the SQL, invoke appropriate UDFs to score the comparison, prepare a result set, and return the results to the SSE. The SSE would then aggregate the results of the individual attribute comparison requests in order to "roll up" the overall score for the document. This approach had adverse effects on the performance of the SSE server, the DBMS, and the network. Remote scoring and aggregation minimizes these adverse effects.

Prior SSE servers are limited in its capacity to service clients because of the volume of database requests it must launch and manage. Each client transaction resulted in multiple database requests and responses between an SSE server and a DBMS, which can soon become saturated to the point that new requests must wait for others to complete before the SSE server has capacity to handle them. And since the prior SSE servers must wait for the results of all the database requests before they can score the document, search latency is impacted by any delay at the DBMS. Finally, the prior SSE servers are further burdened by the need to perform a multistage "roll up", where results for the various anchor values are aggregated in a hierarchical fashion to yield scores for each group and the scores for child groups are aggregated to yield scores for the entire document.

Regarding the impact on the SSE server, the present invention relocates the "roll up" to the DBMS from the SSE server. By the SSE server passing the DBMS an SQL command that returns the similarity score for each qualified document, the number of database transactions per search drops from one per anchor value to one overall. This can greatly reduce the transaction overhead on the part of the SSE server, simplify the launching and tracking of requests, and eliminate the need for SSE server to get involved in aggregation of scores. The result is a substantial increase in the capacity of the SSE server to process client requests. Depending on the choice of DBMS and SSE server components, the performance gain resulting from this novel configuration may be in the 30-60% range.

A second impact of the use of remote scoring and aggregation is a significant reduction in the volume of network traffic between the SSE server and the DBMS. This is accompanied by a reduction in the "burst" nature of the interaction, which has resulted in undesirable peaks and valleys in demands for network capacity.

To process a single search request with prior SSEs, an SQL statement is issued for each attribute anchor value specified by the client. Each of these requires an SQL packet to be prepared by the SSE server, transferred to the DBMS, and placed on the DBMS request queue. For a typical multi-attribute search involving 7-10 anchor values, this means 7-10 SQL requests soon followed by 7-10 responses. With each search instigating 14-20 network transactions, there soon comes a point when the volume of search traffic has an adverse impact on the network. The problem is exacerbated by the tendency of the SSE server to launch requests 7-10 at a time. Even more serious is the network impact of the result sets, which may contain a record for every record in the database that is searched. However, these are all needed by prior SSE servers, which have to collect all the results before it can begin the process of scoring and aggregating.

In the present invention where the scoring and aggregation are relocated to the DBMS, network traffic for SSE server becomes more manageable. Since only one SQL statement is needed, the request-handling overhead on both the SSE server and the DBMS is greatly reduced. The SSE server no longer has to inventory responses or hold some results for a client request while waiting for others to arrive. Another important consequence of the shift to remote scoring and aggregation is the smoothing of the network load, since each search requires only a single request and response. The result set for the present invention is about the same size as for prior systems, but only one is returned per search. Furthermore, since all the results are merged at the DBMS, it becomes possible to order the result set within the DBMS such that the highest scoring documents arrive first at the SSE server. With this new arrangement, the SSE server may obtain the scores it needs from just the first records in the result set, allowing it to skip the rest of the results and complete the operation sooner.

Remote scoring and aggregation can improve DBMS performance in several ways. In the present invention, the DBMS has only one SQL statement to queue, parse, strategize, etc. Depending on the DBMS, there is some additional execution performance to be gained by virtue of submitting one complex SQL statement, whose performance the DBMS may be able to optimize, rather than a sequence of simpler SQL statements that would have to be executed independently. The additional work required for aggregation is minimized by the SSE's use of fully normalized weights in the SQL command. As a result, the DBMS has only to compute a straightforward weighted sum to produce the document-level score, avoiding the tree-wise "rollup" required with prior SSEs.

A side-effect of locating the target database at a remote location is that complete search requests and results sets may be exposed to a network that is not itself secure. Therefore, the deployment of remote scoring and aggregation may require the establishment of a secure connection between the similarity search engine and the remote database management system.

Another deployment consideration is the capability to maintain critical configuration data structures in persistent storage. In some implementations, the XML configuration files employed by the similarity search engine were always stored in the local filesystem of the server hosting the similarity search engine. Though the local filesystem provided a basic persistence service, it could not provide update journaling, online backup, locking, and replication services on a par with database management systems. Therefore, the implementation of the remote scoring and aggregating similarity search engine is extended to include support for persistence drivers.

An embodiment of the present invention is a method for performing similarity searching by remote scoring and aggregating comprising the steps of persisting user defined functions and configuration files for a similarity search server in one or more remote database management systems, receiving a request by the similarity search server from one or more clients for initiating a similarity search, the request designating an anchor document and at least one search document, generating one or more commands from the client request, sending the one or more commands from the similarity search server to the one or more remote database management systems, executing the one or more commands in the one or more database management systems to determine normalized document similarity scores using the persisted user defined functions and configuration files, generating a search result from the similarity scores in the one or more database management systems; and sending the search result to the search server for transmittal to the one or more clients. The step of executing one or more commands may comprise identifying a persisted schema document for defining a structure of search terms, providing persisted target search values, and designating persisted measure, choice and weight algorithms to be used to determine normalized document similarity scores. The step of executing the one or more commands may further comprise using persisted user defined functions contained within libraries of the database management systems for implementing measure algorithms to determine attribute similarity scores, weighting functions and choice algorithms for determining normalized document similarity scores. The step of executing the one or more commands may further comprise computing attribute token similarity scores having values of between 0.00 and 1.00 for the corresponding leaf nodes of the anchor document and a search document using designated persisted measure algorithms, multiplying each token similarity score by a designated persisted weighting function, and aggregating the token similarity scores using designated persisted choice algorithms for determining a document similarity score having a normalized value of between 0.00 and 1.00 for the at least one search document. The step of generating a search result may further comprise designating a persisted structure to be used by a result dataset, and imposing persisted restrictions on the result dataset. The step of receiving a request may comprise designating measures that override persisted measures for determining attribute token similarity scores, designating choice algorithms that override persisted choice algorithms for aggregating token similarity scores into document similarity scores, and designating weights that override persisted weights to be applied to token similarity scores. The step of generating a search result may further comprise structuring the similarity scores by imposing restrictions on the similarity scores according to a designated persisted user defined function. The step of imposing restrictions may be selected from the group consisting of defining a range of similarity scores to be selected and defining a range of percentiles of similarity scores to be selected. The step of generating a search result may further comprise sorting the similarity scores according to a designated persisted user defined function. The step of generating a search result may further comprise grouping the similarity scores according to a designated persisted user defined function. The step of generating a search result may further comprise executing statistics commands according to a designated persisted user defined function. The step of executing the one or more commands to determine normalized document similarity scores may further comprise computing a normalized similarity score having a value of between 0.00 and 1.00, whereby a normalized similarity indicia value of 0.00 represents no similarity matching, a value of 1.00 represents exact similarity matching, and values between 0.00 and 1.00 represent degrees of similarity matching. The step of sending the one or more commands may further comprise invoking an instance of a datasource object for implementing an interface for the datasource, the datasource object comprising a name, a uniform resource locator, a username, a password and a protocol driver designation. The protocol driver designation may be a Secure Sockets Layer. The method may further comprise the step of establishing a secure connection between the similarity search server and the one or more remote database management systems. The step of persisting configuration files for a similarity search server may comprise persisting configuration files for a gateway, a virtual document manager and a search manager. The step of persisting configuration files for the gateway may comprise persisting a username value, a template value and datasource driver. The step of persisting configuration files for the virtual document manager may comprise persisting a datatype value, a datasource value, a schema value, and a datasource driver. The step of persisting configuration files for the search manager may comprise persisting a measure value, a choice value, a parser value, a datasource value, a schema value, a statistic value, and a datasource driver. The step of executing the one or more commands in the one or more database management systems may comprise executing one coalesced search command to generate all similarity scores of multiple search documents for maximizing the processing once records have been loaded into memory and minimizing the number of disk accesses required. The step of executing the one or more commands in the one or more database management systems may comprise executing commands in multiple database management systems for increased performance, each database management system containing a partition of a total target database to be searched. The method may further comprise the step of horizontally partitioning the total target database to be searched among the multiple database management systems. The method may further comprise the step of vertically partitioning the total target database to be searched among the multiple database management systems. The method may further comprise the step of horizontally and vertically partitioning the total target database to be searched among the multiple database management systems. The method of may further comprise the step of selecting user defined functions for measure algorithms from the group consisting of name equivalents, foreign name equivalents, textual, sound coding, string difference, numeric, numbered difference, ranges, numeric combinations, range combinations, fuzzy, date oriented, date to range, date difference, and date combination. The method may further comprise the step of selecting user defined functions for choice algorithms from the group consisting of single best, greedy sum, overall sum, greedy minimum, overall minimum, and overall maximum. An embodiment of the present invention is a computer-readable medium containing instructions for controlling a computer system to implement the method described above.

Another embodiment of the present invention is a system for performing similarity searching by remote scoring and aggregating comprising means for persisting user defined functions and configuration files for a similarity search server in one or more remote database management systems, means for receiving a request by the similarity search server from one or more clients for initiating a similarity search, the request designating an anchor document and at least one search document, means for generating one or more commands from the client request, means for sending the one or more commands from the similarity search server to the one or more remote database management systems, means for executing the one or more commands in the one or more database management systems to determine normalized document similarity scores using the persisted user defined functions and configuration files, means for generating a search result from the similarity scores in the one or more database management systems, and means for sending the search result to the search server for transmittal to the one or more clients. The means for receiving a request by the similarity search server may be a gateway connected to a client network, the gateway also connecting to a search manager and a virtual document manager. The means for generating one or more commands by the similarity search server may be a search manager connected between a gateway and a database network interface. The means for sending the one or more commands from the similarity search server to one or more remote database management systems may be a database network interface connected to a secure database network, the secure database network connecting to the database management systems. The means for executing the one or more commands may be the remote database management systems, the remote database management systems including a library of user defined functions. The means for sending the search results may be the remote database management systems connected to a secure database network, the secure database network connecting to a database network interface of the similarity search server. The configuration files for the similarity search server may comprise configuration files for the gateway, the virtual document manager and the search manager. The means for persisting user defined functions and configuration files may comprise file system persistence drivers and database persistence drivers. The means for sending the one or more commands and the means for sending the search results may be a persistence driver based on a Secure Sockets Layer protocol. The means for executing the one or more commands in the one or more remote database management systems may comprise one coalesced SQL search command to generate all similarity scores of multiple search documents for maximizing the processing once records have been loaded into memory and minimizing the number of disk accesses required. The means for executing the one or more commands may comprise means for executing commands in multiple remote database management systems for increased performance, each remote database management system containing a partition of a total target database to be searched. The system may further comprise means for horizontally partitioning the total target database to be searched among the multiple database management systems. The system may further comprise means for vertically partitioning the total target database to be searched among the multiple database management systems. The system may further comprise means for horizontally and vertically partitioning the total target database to be searched among the multiple database management systems. The user defined function for a measure algorithm may be selected from the group consisting of name equivalents, foreign name equivalents, textual, sound coding, string difference, numeric, numbered difference, ranges, numeric combinations, range combinations, fuzzy, date oriented, date to range, date difference, and date combination. The user defined function for a choice algorithm may be selected from the group consisting of single best, greedy sum, overall sum, greedy minimum, overall minimum, and overall maximum. The means for sending the one or more commands from the similarity search server to one or more remote database management systems may be via a secure database network connection, and the means for sending the search results to the search is via a secure database network connection.

Yet another embodiment of the present invention is a system for performing similarity searching by remote scoring and aggregating comprising user defined functions and configuration files for a similarity search server persisted in one or more remote database management systems, one or more clients communicating with a similarity search server for requesting a similarity search between an anchor document and at least one search document, the similarity search server processing the similarity search request and constructing one or more commands from the similarity search request, the similarity search server communicating with one or more remote database management systems for transmitting the one or more commands, the one or more remote database management systems executing the one or more commands to obtain a similarity search result, the one or more database management systems communicating with the similarity search server for transmitting the search result, and the similarity search server processing the similarity search result and communicating with the one or more clients for transmitting a similarity search response to the one or more clients. The system may further comprise a secure client network connection for transmitting a similarity search request and similarity search response between the one or more clients and the similarity search server. The system may further comprise a secure database network connection for transmitting the one or more commands and the search results between the one or more remote database management systems and the similarity search server.

BRIEF DESCRIPTION OF THE DRAWINGS

These and other features, aspects and advantages of the present invention will become better understood with regard to the following description, appended claims, and accompanying drawings wherein:

FIG. 3 depicts an example of an XML document;

FIG. 4 depicts an example of a Dataset in XML form;

FIG. 5 depicts a basic structure of a MAP file;

FIG. 6 depicts an example dataset of names;

FIG. 7 depicts an example dataset of addresses;

FIG. 8 depicts an example dataset of combined names and addresses;

FIG. 9 depicts an example dataset of names with characters specified as lower case;

FIG. 10 depicts an example dataset resulting form and SQL statement calling the UDF MYFUNCTION;

FIG. 14 shows several similarity functions that are related to name matching, including closeness of names, sounds and strings;

FIG. 15 shows several similarity functions for address matching, including closeness of street names, cities, and ZIP codes;

FIG. 16 depicts an example dataset resulting from an SQL statement for the closest match to "BRIAN BAILEY" in the example list of names in the dataset NAMES shown in FIG. 6;

FIG. 17 shows the score results of determining a match between people by including both name and address information from FIG. 8 in an SQL statement query;

FIG. 18 shows the name results of using a similarity UDF to filter the returned records to meet the search criteria requiring a match of better than 90%;

FIG. 19 shows the score results of using a similarity UDF to filter the returned records to meet the search criteria requiring a match of better than 90%, as shown in FIG. 18;

FIG. 20 shows a result set of an SQL statement used to sort the result set based on the person's last_name as compared to "RIGLEY";

FIG. 21 shows a result set of an SQL statement that used a two-attribute weighted-average solution of first and last names similar to "BRIAN BAILY";

FIG. 22 shows a result set of an SQL statement that uses multiple UDFs in determining a general multi-attribute solution of names similar to "BRIAN BAILY";

FIG. 23 shows a score result set as an example of an SQL statement that uses search coalescing;

FIG. 24 describes the measures implemented as UDFs;

FIG. 26 shows the definition of a DATASOURCE element;

FIG. 27 shows and example implementation of a DATASOURCE element;

FIG. 28 shows the definition of a filesystem PERSISTENCE element;

FIG. 29 shows the definition of a database PERSISTENCE element;

FIG. 30 shows an example of a filesystem PERSISTENCE element;

FIG. 31 shows an example of a database PERSISTENCE element;

FIG. 32 shows an example of a composite PERSISTENCE element;

FIG. 33 shows an example of a pathname prepending PERSISTENCE element;

FIG. 36 is an example invocation of the PERSISTENCE drivers for the command manager configuration file;

FIG. 37 is an example invocation of the PERSISTENCE drivers for the search manager configuration file;

FIG. 38 is an example invocation of the PERSISTENCE drivers for the virtual document manager configuration file.

DETAILED DESCRIPTION OF THE DRAWINGS

Figure 1:
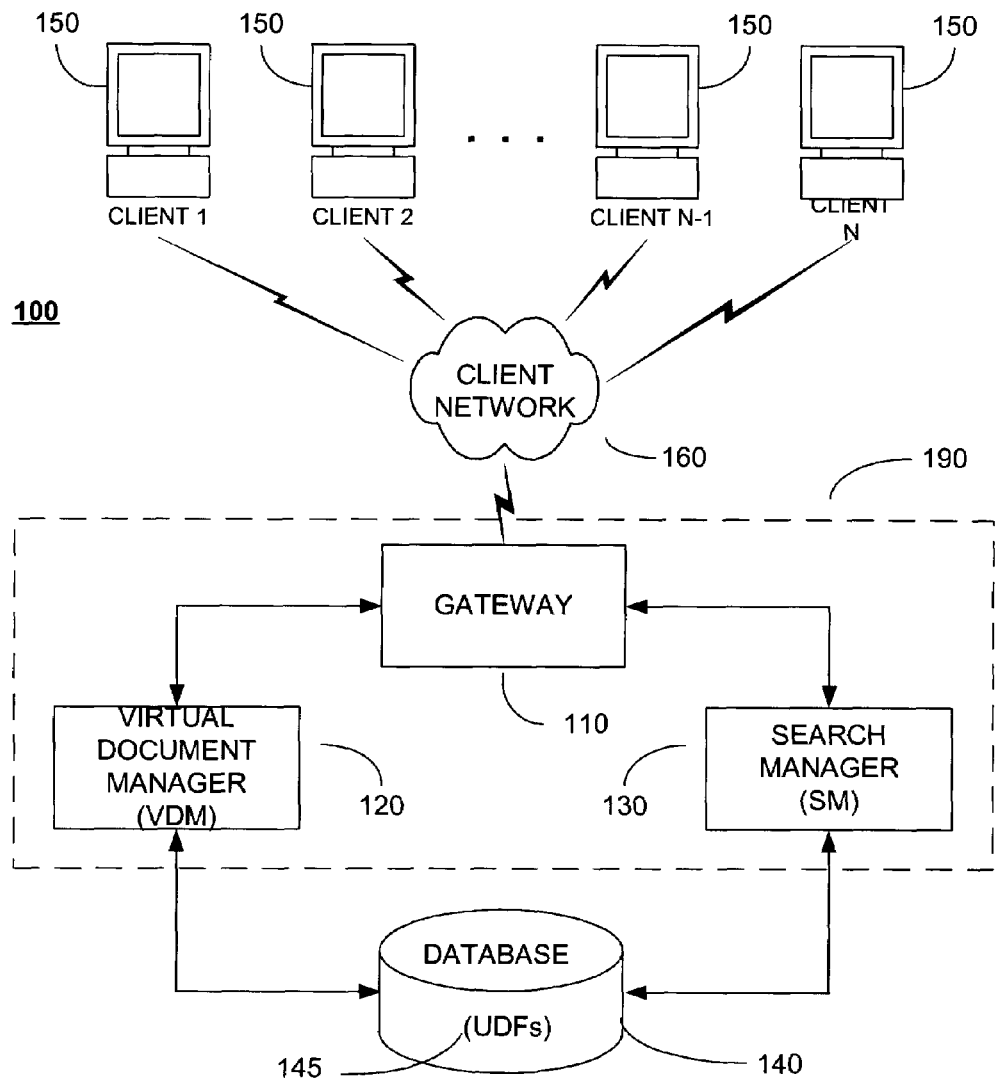
FIG. 1 depicts an architecture of a prior art Similarity Search Engine (SSE)

Before describing the architecture of the Similarity Search Engine (SSE), it is useful to define and explain some of the objects used in the system.

The SSE employs a command language based on XML, the Extensible Markup Language. SSE commands are issued as XML documents and search results are returned as XML documents. The specification for Extensible Markup Language (XML) 1.0 (Second Edition), W3C Recommendation 6 Oct. 2000 is incorporated herein by reference. The syntax of the SSE Command Language XCL consists of XML elements, their values and attributes that control the behavior of the SSE. Using SSE commands, a client program can define and execute searches employing the SSE.

The SSE commands are shown here in abstract syntax notation using the following conventions:

Regular type Shows command words to be entered as shown (uppercase or lowercase)

Italics Stands for a value that may vary from command to command

XML tags are enclosed in angled brackets. Indentations are used to demark parent-child relationships. Tags that have special meaning for the SSE Command Language are shown in capital letters. Specific values are shown as-is, while variables are shown in italic type. The following briefly defines XML notation:

| | |
|---|---|
| <XXX> | Tag for XML element named XXX |
| <XXX attribute="value"/> | XML element named XXX with specified value for attribute |
| <XXX>value</XXX> | XML element named XXX containing value |
| <XXX><br><YYY>value</YYY> | XML element named XXX containing element named YYY with the value that |

-continued

| | |
|---|---|
| </XXX> | appears between the tags. In xpath notation, this structure would be written as XXX/YYY |

A datasource can be considered a logical connection to a data store, such as a relational database. The datasource object manages the physical connection to the data store internally. Although the SSE may support many different types of datasources, the preferred datasource used in the SSE is an SQL database, implemented by the vdm.RelationalDatasource class.

A relational datasource definition is made up of attributes, comprising Name, Driver, URL, Username and Password, as described in Table 2.

TABLE 2

| ATTRIBUTE | PURPOSE |
|---|---|
| Name | Within the context of an SSE, the name uniquely identifies this datasource |
| Driver | The actual class name of the JDBC driver used to connect to the relational data store |
| URL | The URL, as defined by the driver, used to locate the datasource on a network |
| Username | The username the SQL database requires for a login |
| Password | The password the SQL database requires for a login |

A schema is at the heart of everything the SSE does. A schema is a structural definition of a document along with additional markup to provide SQL database mapping and similarity definitions. The definition of a schema comprises Name, Structure, Mapping and Semantics, as described in Table 3.

TABLE 3

| ATTRIBUTE | PURPOSE |
|---|---|
| Name | Within the context of an SSE, the name uniquely identifies this schema |
| Structure | The structure clause of a schema defines the XML output format of documents which are built based on this schema. |
| Mapping | The mapping clause of a schema defines how each of the elements of the structure map to relational fields and tables as defined by the datasource |
| Semantics | The semantics clause of a schema defines the default similarity settings to be used when issuing a query against this schema/datasource |

A query is an XCL command that dictates which elements of a schema (actually the underlying database) should be searched, their search criteria, the similarity measures to be used and which results should be considered in the final output. The query format is sometimes referred to a Query By Example (QBE) because an "example" of what we are looking for is provided in the query. Attributes of a query comprise Where clause, Semantics, and Restrict, as described in Table 4. An XCL query command may be translated into one or more SQL statements containing measures, which may be transmitted to an SQL Database.

TABLE 4

| ATTRIBUTE | PURPOSE |
|---|---|
| Where clause | The WHERE clause serves as the QBE portion of the query, this is what we are looking for. |

TABLE 4-continued

| ATTRIBUTE | PURPOSE |
|---|---|
| Semantics | The SEMANTICS clause of a query determines how we want to search the database. This includes: similarity functions to use to compare values weights of elements in the overall score how to combine the element scores into an overall score |
| Restrict | The RESTRICT clause of a query dictates which portions of the result we are interested in. E.g. those document that score 0.80 or greater, or the top 20 documents etc.. |

A measure, in terms of implementation, is a function that takes in two strings and returns a score (from 0 to 1) of how similar the two strings are. These measures are implemented as User Defined Functions (UDFs) and are compiled into a native library in an SQL Database. Measures are made up of attributes comprising Name, Function and Flags, as described in Table 5.

TABLE 5

| ATTRIBUTE | PURPOSE |
|---|---|
| Name | Within the context of an SSE, the name uniquely identifies this measure |
| Function | The associated native measure implementation associated to this name. For example, a measure named "String Difference" may actually call the STDIFF( ) function |
| Flags | There are several other flags that indicated whether the function operates on character data, numeric data, date data etc. or a combination of them. |

As discussed above, the present invention is a system and method for using a relational Database Management System (DBMS) to compare an anchor value (or set of anchor values) against a set of target values in the database to determine a similarity score indicating how closely the values being compared are to being the same. This process of similarity scoring takes place in two main phases. First is the application of measures to determine the degree of similarity between each anchor value attribute and the corresponding target value attributes in the database. Second is the aggregation of these individual attribute scores to yield an overall similarity score for the document. Though many methods of aggregating scores are available, the present Similarity Search Engine (SSE) employs a weighted average such that each anchor value attribute has a weight that indicates its relative contribution to the score of its group or document, and each group has a weight that indicates its relative contribution to the score of its parent group or parent document. This treewise aggregation is performed "bottom up" according to the hierarchical structure of the document until a single score is produced for the uppermost "root" node of the hierarchy. This operation is sometimes called a "rollup".

Turning now to FIG. 1, FIG. 1 depicts a high level architecture 100 of a prior art Similarity Search Engine (SSE) that makes use of the existing RDBMS infrastructure and the ability to extend built-in RDBMS functionality via the use of User Defined Functions (UDFs) 145 as similarity measures. The SSE architecture 100 includes Clients 150, a Client Network 160, a Gateway 110, a Virtual Document Manager (VDM) 120, a Search Manager (SM) 130 and an SQL Database 140. The Gateway 110, VDM 120, and SM 130 comprise an SSE Server 190. The Gateway 110 provides routing and user management from one or more Clients 150 via a Client Network 160. The Clients 150 initiate similarity searches by sending search requests to the Gateway 110 via the Client Network 160. After a similarity search has been completed, the Gateway 110 sends results of a requested similarity search back to the requesting Client 150 via the Client Network 160. The VDM 120 provides XML document generation. The SM 130 configures SQL requests to the SQL Database 140 and performs document aggregation and scoring. The SQL Database 140 provides data persistence and retrieval, document attribute scoring, and storage of User Defined Functions (UDFs). One of the functions of the UDFs is to provide document attribute scoring within the SQL Database 140. In FIG. 1, the SM 130 receives individual attribute similarity scores from the SQL Database 140 and performs document scoring and aggregation itself. Because of the high volume of requests for attribute scores required in a typical similarity search, the ability of the SSE shown in FIG. 1 to access remote databases is constrained by the resulting high level of network traffic required between the SM 130 and the SQL Database 140, as well as the processing capability of the SM 130 and the SQL Database.

Figure 2:
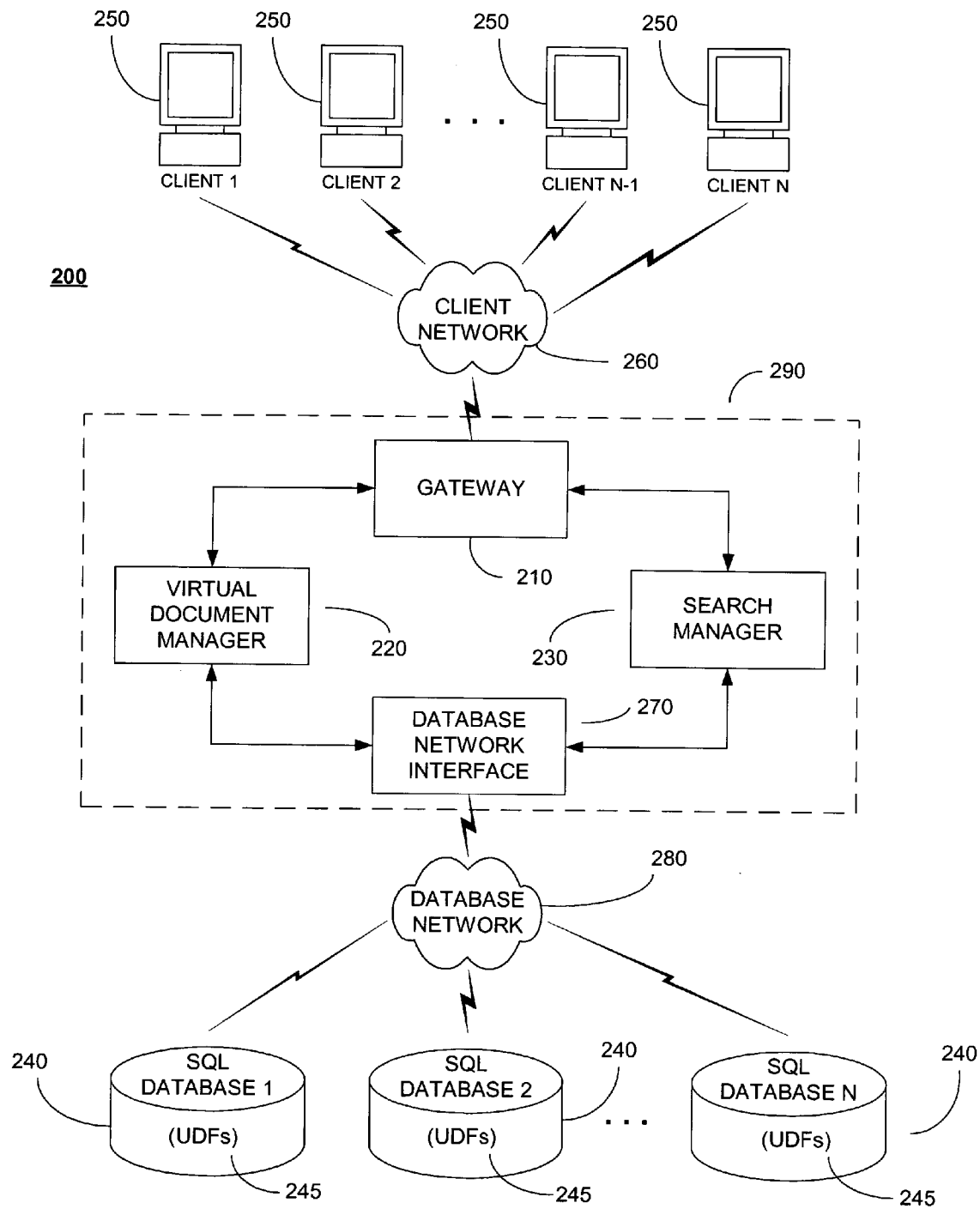
FIG. 2 depicts an architecture of a Similarity Search Engine (SSE) according to the present inventive concepts.

Turning now to FIG. 2, FIG. 2 depicts a high level architecture 200 of a Similarity Search Engine (SSE) that makes use of the existing RDBMS infrastructure and the ability to extend built-in RDBMS functionality via the use of User Defined Functions (UDFs) 245 as similarity measures to remote databases. The SSE architecture 200 includes Clients 250, a Client Network 260, a Gateway 210, a Virtual Document Manager (VDM) 220, the Search Manager (SM) 230, a Database Network 280 and one or more remote SQL Databases 240. The Gateway 210, VDM 220, SM 230, and Database Network Interface 270 comprise an SSE Server 290. The Gateway 210 provides routing and user management from one or more Clients 250 via a Client Network 260. The Clients 250 initiate similarity searches by sending search requests to the Gateway 210 via the Client Network 260. After a similarity search has been completed, the Gateway 210 sends results of a requested similarity search back to the requesting Client 250 via the Client Network 260. The VDM 220 provides XML document generation. The SM 230 constructs Structured Query Language (SQL) statements for transmittal to the SQL Databases 240 via the Database Network Interface 270 and a Database Network 280. The SQL Databases 240 provides data persistence and retrieval, document attribute scoring, document aggregation and scoring, and storage of User Defined Functions (UDFs) 245. One of the functions of the UDFs is to provide document attribute scoring within the SQL Databases 240. An advantage of multiple SQL Databases 240 is that they provide the capability to partition the target database among several SQL Databases 240, which enable simultaneous or parallel processing of similarity searches using UDFs 245. In FIG. 2, the SQL Databases 240 perform both individual attribute similarity scoring and aggregation, as well as coalescing searches for greater efficiency. The features introduced and discussed relative to FIG. 2 is the relocation of the second phase of scoring from the SM 230 to the SQL Databases 240, so that where the SM 130 shown in FIG. 1 received individual attribute similarity scores from the SQL Database 140 and performed the document scoring and aggregation itself, the system shown in FIG. 2 allows the SQL Databases 240 to perform the document scoring and aggregation and the SM 230 receives just the document-level similarity scores. Because of the high volume of requests for attribute scores required in a typical similarity search, the ability of the SSE shown in FIG. 1 to access remote databases is constrained by the resulting high level of network traffic required between the SM 130 and the SQL Database 140. The ability to search remote databases is an important feature of the system shown in FIG. 2. It allows searching any database of any size located anywhere without moving the data. Once the data and document scoring are separated from the search server, as shown in FIG. 2, communication between the database and the search server is minimized. This enables the use of database table partitioning to achieve further improvements the stability, scalability, and performance of similarity search.

The Gateway 210 serves as a central point of contact for all client communication by responding to commands sent by one or more clients. The Gateway 210 supports a plurality of communication protocols with a user interface, including sockets, HTTP, and JMS. The Gateway 210 is implemented as a class available in the unique generic architecture referred to as the XML Command Framework (XCF), which handles the details of threading, distribution, communication, resource management and general command handling. A user may be added to a user definition file in order to log on and log off of the SSE.

The Gateway 210 includes several instances of command handlers inherited from the generic XCF architecture to properly route incoming XML Command Language (XCL) commands to an appropriate target, whether it is the VDM 220, the SM 230, or both. These command handlers used by the Gateway 210 for routing are shown in Table 6.

TABLE 6

| COMMAND HANDLER | FUNCTIONALITY |
| --- | --- |
| xcf.commands.SynchronizedPassthrough (SPT) | Passes an XCL command through to one or more targets, one after the other. If one of the commands passed through fails, the command handler reports the failure and terminates execution. |
| xcf.commands.Passthrough (PT) | Passes an XCL command to one target. The target must determine and report success or failure. |

Table 7 shows the routing of commands types processed by the Gateway 210, and which command handler is relied upon for the command execution.

TABLE 7

| COMMAND TYPE | COMMAND OPERATION | ROUTING | COMMAND HANDLER |
| --- | --- | --- | --- |
| SCHEMA | Write | VDM, SM | SPT |
| SCHEMA | Delete | VDM, SM | SPT |
| DATASOURCE | Write | VDM, SM | SPT |
| DATASOURCE | Delete | VDM, SM | SPT |
| DOCUMENT | Write | VDM, SM | SPT |
| DOCUMENT | Delete | VDM, SM | SPT |
| MEASURE | All | SM | PT |
| CHOICE | All | SM | PT |
| STATISTICS | All | SM | PT |
| QUERY | All | SM | PT |
| All others | — | VDM | PT |

The communication between the Gateway 210 and the VDM 220, and between the Gateway 210 and the SM 230 is via the XML Command Language (XCL).

The VDM 220 is responsible for XML document management, and connects between the Gateway 210 and the SQL Database 240. The VDM 220 is implemented by a class, which is available in the unique generic architecture referred to as the XML Command Framework (XCF), which handles the details of threading, distribution, communication, resource management and general command handling. The XCF is discussed below in more detail. Therefore, the VDM 220 inherits all the default command handling and communication functions available in all XCF Command Servers. Unlike XML databases having proprietary storage and search formats, the VDM 220 uses existing relational tables and fields to provide dynamic XML generation capabilities without storing the XML documents.

The VDM 220 provides its document management capabilities through Document Providers. A Document Provider is responsible for generating and storing XML documents based on a schema definition. Although described embodiments of the SSE server only implement one DocProvider, which is an SQL based document provider, if the DocProvider implements the interface, the document provider can be any source that generates an XML document. For example, document providers may be file systems, web sites, proprietary file formats, or XML databases. For a user to retrieve relational data, the user must know where the data resides and how it is connected. A datasource definition and its implementation provide an object that encapsulates all the connection information.

There are several types of command handlers required by the VDM 220 in order to satisfactorily execute XCL commands. These include the document related command handlers shown in Table 8.

TABLE 8

| COMMAND HANDLER | FUNCTIONALITY |
| --- | --- |
| vdm.commands.DocumentRead | Builds an XML document based on a schema, its mapping, and a primary key, by assembling from records and fields. |
| vdm.commands.DocumentWrite | Writes an XML document based on a schema, its mapping, and a primary key, by disassembling into records and fields. |
| vdm.commands.DocumentDelete | Deletes an XML document based on a schema, its mapping, and a primary key, by removing relevant records. |
| vdm.commands.DocumentCount | Counts the number of unique documents for a particular schema. |
| vdm.commands.DocumentLock | Locks a document based on its schema name and primary key. Subsequent locks on this document will fail until it is unlocked. |
| vdm.commands.DocumentUnlock | Unlocks a document based on its schema name and primary key. |

Schema related command handlers required by the VDM 220 are shown in Table 9.

TABLE 9

| COMMAND HANDLER | FUNCTIONALITY |
| --- | --- |
| vdm.commands.SchemaWrite | Initializes a DocProvider based on the schema and mapping defined for the schema. |
| xcf.commands.ComponentRead | Provides a means to read a schema. |
| vdm.commands.SchemaDelete | Uninitializes a DocProvider and drops it from the list of available schemas. |

Datasource related command handlers required by the VDM 220 are shown in Table 10.

TABLE 10

| COMMAND HANDLER | FUNCTIONALITY |
| --- | --- |
| vdm.commands.DatasourceWrite | Creates and initializes the vdm.ConnectionInfo object that contains all relevant datasource information. |
| vdm.commands.DatasourceDelete | Uninitializes a datasource and removes it from the list of available datasources. |
| xcf.commands.ComponentRead | Provides a means to read a datasource. |
| vdm.commands.DatasourceMetadata | Connects to the datasource and examines all the tables, field types and lengths, indices, view defined in the datasource so that the DocProvider may make informed decisions on how to best handle the data. |

The VDM 220 communicates with the SQL Databases 240 via the Java Database Connectivity (JDBC) application programming interface via the Database Network Interface and the Database Network 280.

Turning now to FIG. 3, FIG. 3 depicts an example XML document, used by the VDM 220 shown in FIG. 2, which maps the relationships between the XML documents to be dealt with and relational databases. The map can specify that when building an XML document from the database, the data in claim/claimant/name should come from the claimants table of the database, while /claim/witness/name should come from the Witnesses table. Conversely, when writing an existing XML document of this form out to the database, the map will tell the driver that it should write any data found at /claim/claimant/name out to the claimants table, in this case to the "name" field, and write the data found at /claim/witness/name out to the "name" field of the Witnesses table. Through describing these relationships, the map allows the VDM to read, write, and delete XML documents.

Turning to FIG. 4, FIG. 4 shows a dataset having an XML form that represents relationships between XML documents and relational databases that is stored in a Java model called a Dataset. FIG. 4 represents the basic structure of a map file. At the beginning of initialization, the XML map is parsed and used to build a hierarchy of Datasets, one level of hierarchy for each database table referenced in the map. This encapsulation of the XML parsing into this one area minimizes the impact of syntax changes in the XML map. These Datasets have the XML form shown in FIG. 4. FIG. 4 depicts an example of a Dataset in XML form. The <EXPRESSION> tag indicates whether the Dataset describes a document based on a relational table or a document based on a SQL statement. If the expression value is "table," then initializing a relational driver with this Dataset will allow full read/write functionality. However, if the expression value is "sql," then the initialized driver will allow documents to be generated from the database, but not to be written out to it. During initialization, SQL statements are created for select, insert, and delete functionality using the Dataset's <EXPRESSION> data. If the type attribute equals "table," then the statements are built using the table name and the field names.

Each Dataset has one to n <BIND> tags. In the common usage, in which the Dataset is describing a relational table, these bindings define the key fields used in the master-detail relationship. The topmost Dataset's binding simply describes its primary key. Since it has no relationship with any higher-level Dataset, its binding does not have the <MASTER> element that other Datasets' binds have. A Dataset's <PATH> tag describes where the data being read from the table should go in the overall final XML document, or vice-versa when writing XML out to the database.

Each Dataset will also have 1 to n <FIELDS>. These fields are the fields that are used to build the select and insert statements, and are any fields of interest contained within the table that the Dataset describes. Each of these fields contains a <TYPE> that describes the data type of the database's field (e.g., String, Int, Double), and <PATH> which describes the mapping of this XML leaf to the database field. When building an XML document, the path describes the database field that data is pulled from. In writing an XML document back to the database, this path is the target field that the leaf's data is to be written to. If the information being written out or read in lies in the attribute of the leaf, this can be specified by including a path to the leaf, and then the attribute name preceded by an @ (e.g. <PATH>Claim/@dateEntered</PATH>). In the minimum, there will always be at least one Dataset for any given map. For expression of a multiple tables in a one-to-many relationship, the Dataset form allows for nesting of child Datasets within it. A Dataset can have zero through n child Datasets.

Composition of documents follows this basic algorithm shown in FIG. 5. A row is taken from the topmost array of arrays, the one representing the master table of the document. The portion of the XML document that takes information from that row is built. Next, if there is a master-detail relationship, the detail table is dealt with. All rows associated with the master row are selected, and XML structures built from their information. In this manner, iterating through all of the table arrays, the document is built. Then, the master array advances to the next row, and the process begins again. When it finishes, all of the documents will have been built, and they are returned in String form.

Turning back to FIG. 2, the SM 230 is responsible for SQL statement generation, and connects between the Gateway 210 and the SQL Databases 240 via the Database Network Interface 270 and the Database Network 280. The SM 230 is implemented as a class available in the unique generic architecture referred to as the XML Command Framework (XCF), which handles the details of threading, distribution, communication, resource management and general command handling. The XCF is discussed below in more detail. Therefore, the SM 230 inherits all the default command handling and communication functions available in all XCF Command Servers. The SM 230 does not maintain any of its own indexes, but uses a combination of relational indexes and User Defined Functions (UDFs) 245 to provide similarity-scoring methods in addition to traditional search techniques. A simple SQL command sent by the SM 230 is used to register a UDF 245 with an SQL Database 240.

There are several types of command handlers required by the SM 230 in order to satisfactorily execute XCL commands. These include the schema related command handlers shown in Table 11.

TABLE 11

| COMMAND HANDLER | FUNCTIONALITY |
| --- | --- |
| search.commands.SchemaWrite | Stores a simple XML version of a schema. |

TABLE 11-continued

| COMMAND HANDLER | FUNCTIONALITY |
| --- | --- |
| xcf.commands.ComponentRead | The default component reader provides a means to read a schema. |
| vdm.commands.ComponentRemove | The default component deleter provides a means to delete a schema. |

Datasource related command handlers required by the SM 230 are shown in Table 12.

TABLE 12

| COMMAND HANDLER | FUNCTIONALITY |
| --- | --- |
| search.commands.DatasourceWrite | Creates and initializes the vdm.ConnectionInfo object that contains all relevant datasource connection information. |
| vdm.commands.ComponentRemove | The default component deleter provides a means to delete a datasource. |
| xcf.commands.ComponentRead | The default component reader provides a means to read a datasource. |

Measure related command handlers required by the SM 230 are shown in Table 13.

TABLE 13

| COMMAND HANDLER | FUNCTIONALITY |
| --- | --- |
| search.commands.MeasureWrite | Stores a simple XML version of a measure |
| xcf.commands.ComponentRead | The default component reader provides a means to read a measure. |
| vdm.commands.ComponentRemove | The default component deleter provides a means to delete a measure. |

Choice related command handlers required by the SM 230 are shown in Table 14.

TABLE 14

| COMMAND HANDLER | FUNCTIONALITY |
| --- | --- |
| search.commands.ChoiceWrite | Stores a simple XML version of a choice. |
| xcf.commands.ComponentRead | The default component reader provides a means to read a choice. |
| vdm.commands.ComponentRemove | The default component deleter provides a means to delete a choice. |

The SM 230 communicates with the SQL Databases 240 via the Java Database Connectivity (JDBC) application programming interface by a connection through the Database Network Interface 270 and the Database Network 280.

Regarding the SQL Databases 240 shown in FIG. 2, the SQL Databases 240 are relational DataBase Management Systems (DBMS) that organize data into tables with rows and columns. Consider the example dataset of names shown in FIG. 6. Each row in the dataset refers to the name of a person and each column refers to an attribute of that name.

In FIG. 6, a person's name is defined as NAME_FIRST, NAME_MIDDLE, NAME_LAST. The first, middle, and last name are not guaranteed to be unique as there may be many people that share that name combination. Therefore, the dataset introduces a column to uniquely identifying this "person" by a number, referred to as PKEY, and the dataset guarantees that no two people share the same PKEY. This column is also known as a Primary Key.

Consider another example dataset of addresses shown in FIG. 7. Each row in the dataset of FIG. 7 refers to a person's address, which is made up of the three attributes ADDRESS, CITY, STATE. As in FIG. 6, a PKEY field is introduced to uniquely identify the "location" to which this address belongs.

Structured Query Language (SQL) is a standard data manipulation language (DML). The following SQL statements could be issued to retrieve data from the datasets shown in FIG. 6 and FIG. 7:

select pkey,name_first,name_middle,name_last from NAMES and select pkey,ADDRESS,CITY,STATE,ZIP from ADDRESSES.

These two datasets can be joined thereby creating one "virtual" dataset where both name and address data are combined, as shown in FIG. 8. To combine these tables requires the following SQL statement:

select names.pkey,name_first,name_middle,name_last, address,city,state from names,addresses where names.pkey=addresses.pkey.

Most DBMSs provide a set of built-in functions that programmers can use to manipulate the individual column values. For example LCASE and UCASE will change the case of a column. The following SQL statement would result in the dataset shown in FIG. 9.

select pkey,LCASE(name_first),name_middle,LCASE (name_last) from NAMES

In addition to the built-in functions, most DBMS vendors provide the opportunity for developers to build their own functions and register them with the database. These are known as User Defined Functions (UDFs). UDFs can be written in a programming language other that that defined by the DBMS. These languages may include C, C++, Java, and other compiled languages. Once these functions have been coded and compiled in their native format, they must be defined to the DBMS using the DBMS Data Definition Language (DDL). The DDL describes the following:

a) Name of the UDF
b) Location of the library of code
c) Parameter and return types of the function
d) DBMS-specific flags on how the function should be run The following is an example of how a DDL may look:
DECLARE EXTERNAL FUNCTION MYFUNCTION
CSTRING(255), CSTRING(255)
RETURNS FLOAT BY VALUE
ENTRY_POINT 'my_function' MODULE_NAME 'MyFunctions'.

This DDL statement declares an external function called MYFUNCTION that is invoked by calling the my_function function found in the MyFunctions library. The function takes in two null terminated strings (cstring) and returns a floating point number. Where the compiled library (MyFunctions) resides generally depends on the RDBMS, as does the calling convention the (fastcall, cdecl, register etc) RDBMS expects to use. Once a UDF is registered, the function may be used wherever the return type of the function may be used. As an example, select pkey, MYFUNCTION(name_first,'Brian') from NAMES would return a series of PKEYs with an associated float value which is a result of calling the MYFUNCTION UDF which in turn, as defined by the RDBMS and DDL, calls the my_function function in the MyFunctions library. The result of issuing the statement above may be the dataset shown in FIG. 10.

The use of remote scoring aggregation allows an SSE to interact with the DBMS at the document level rather than at an attribute level. This opens the possibility of using multiple DBMSs operating in parallel to further boost performance, scalability and reliability. Handling of large data sets presents a problem to any search that needs to perform a similarity comparison of every record in a database table. Since the UDFs are executed for every record and every attribute in the search database, as the database grows, performance can become a major issue. In general, as the search database size increases, the time it takes to search for each anchor document increases, although not linearly. As the table grows in size, the performance penalty increases. The solution is to split the table into smaller blocks and assign each block to a different database instance, preferably located in different hardware. This allows each DBMS to manage and search a smaller dataset, improving search performance as well as data scalability. The data can be subdivided in several ways: horizontal partitioning, vertical partitioning, or a combination of both.

Figure 11:
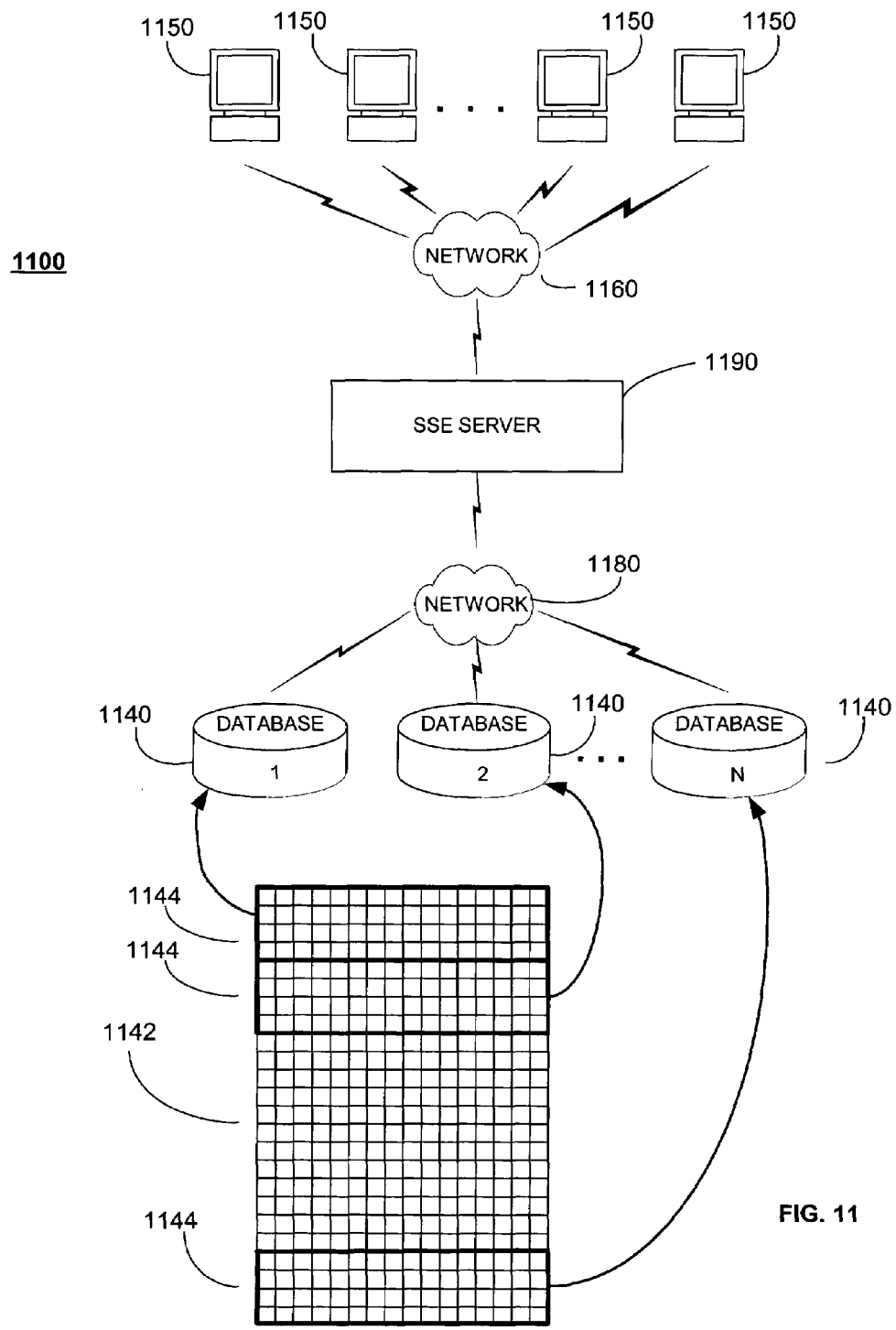
FIG. 11 shows an example of horizontal partitioning of a target data structure that groups the data by records or rows.

Turning to FIG. 11, FIG. 11 shows horizontal partitioning that groups the data by records (rows) such that a large dataset (1 million records) 1142 is separated into N smaller datasets 1144 (1M/N records each) that can be assigned to N separate search databases 1140, each with its own set of UDFs and hardware. As in FIG. 2, the Databases 1140 are connected via a Network 1180 to an SSE Server 1190, which in turn connects to Clients 1150 via a Network 1160. Horizontal partitioning greatly improves search performance by allowing each small partition 1140 to be searched in parallel, hence reducing the time by 1/N, where N is the number of partitions. Each horizontal partition 1140 can be scored independently, leaving it to the application to select and combine the results. Furthermore, it is possible to order the partition searches such that the overall search can stop when any one of the partition searches meets the search criteria.

Figure 12:
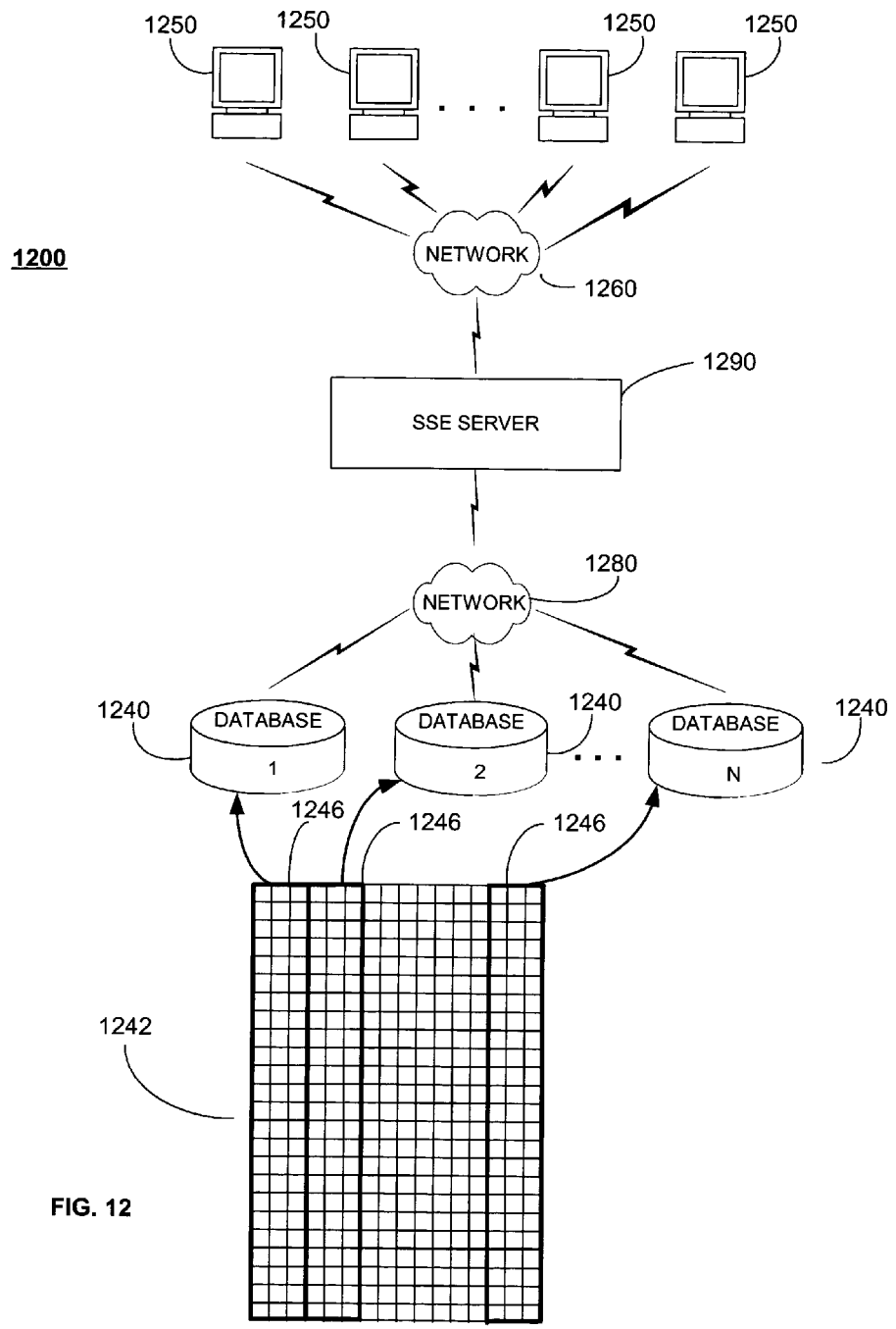
FIG. 12 shows an example of vertical partitioning of a target data structure that groups the data by columns or attributes.

Turning now to FIG. 12, FIG. 12 shows vertical partitioning that groups the data by attributes (columns). In this case, a large attribute set 1242 is grouped by a logical set of attributes 1246 (primary, secondary, etc.) and assigned to different SSE search databases 1240. As in FIG. 2, the Databases 1240 are connected via a Network 1280 to an SSE Server 1290, which in turn connects to Clients 1250 via a Network 1260. Vertical partitioning groups the data by attributes. The most important attributes can be given their own table and scored first. The application can then examine the results to determine which other attributes need to be scored. If a document scores high enough in the first search, the application may be able to determine that there is a match without having to incur the costs of the secondary search on the less important attributes. This can significantly improve performance where certain attributes (such as personal names) tend to dominate the overall scores.

Figure 13:
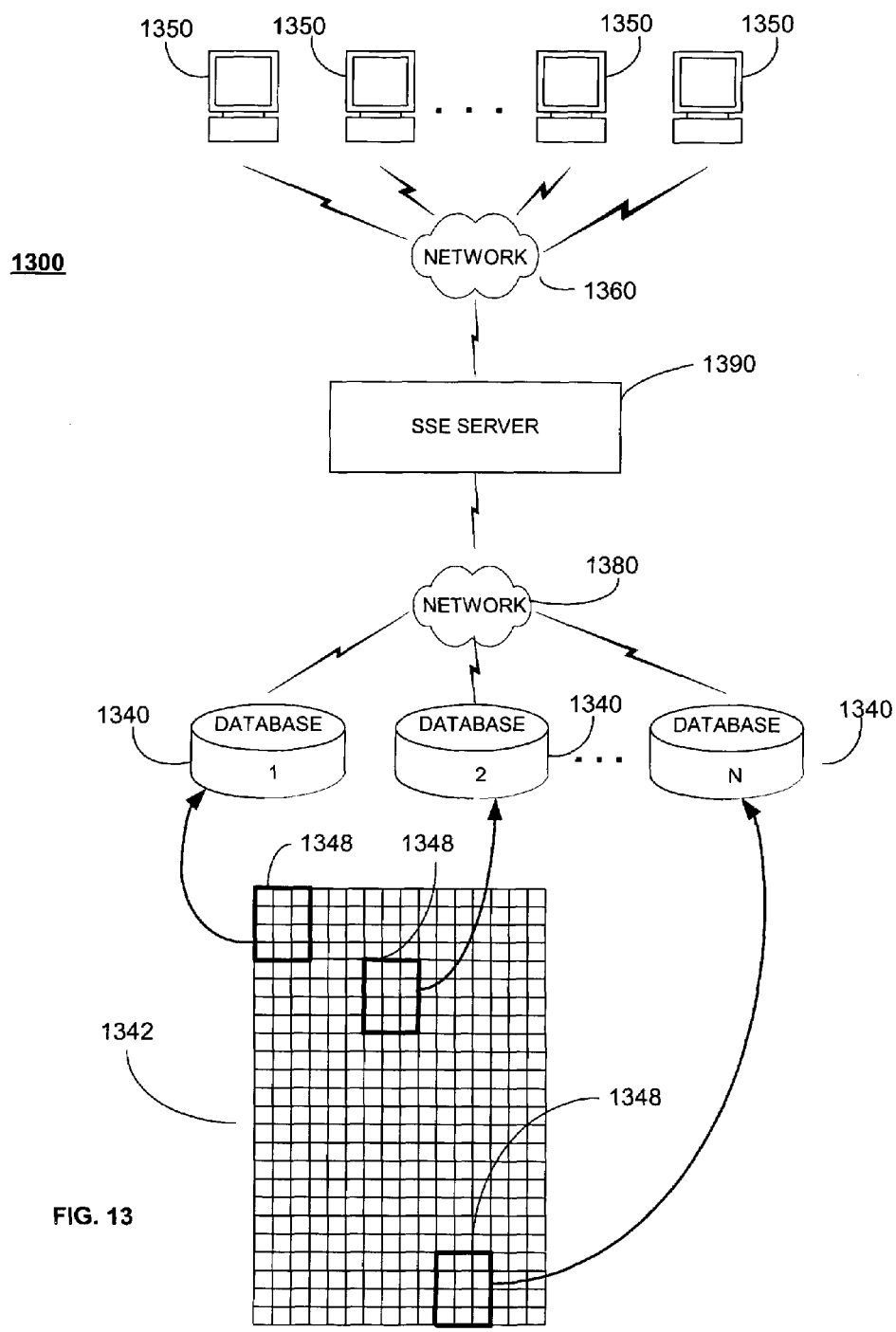
FIG. 13 shows an example of horizontal and vertical partitioning of a target data structure.

Turning now to FIG. 13, FIG. 13 shows a combination of horizontal and vertical partitioning, where a large dataset 1342 is partitioned into smaller partitions 1348 that are distributed geographically throughout the large dataset 1342. Each of the smaller partitions 1348 is connected to different search databases 1340. As in FIG. 2, the Databases 1340 are connected via a Network 1380 to an SSE Server 1390, which in turn connects to Clients 1350 via a Network 1360. The combination of both horizontal and vertical partitioning techniques take advantage of smaller and more efficient search datasets 1348.

Scalability can also be achieved at the database level by allowing the DBMS to partition the data itself. This is a capability of certain enterprise level DBMS, i.e. DB2 UDF EEE. The search server deals with one search database and its UDFs. The DBMS manages the distributed computing at the backend. This improves the scalability but the search performance is unknown.

In order to provide the notion of similarity, a set of functions has been developed to calculate the "distance" or "difference/similarity" of two values, returning a normalized floating point value (between 0 and 1 inclusive) that indicates the closeness or similarity of the two values. These are known as single attribute measures. For example, FIG. 14 shows several similarity functions that are related to name matching, including closeness of names, sounds and strings. Several functions for address matching are shown in FIG. 15, including closeness of street names, cities, and ZIP codes. The examples shown in FIG. 14 and FIG. 15 illustrate measuring two strings and returning a normalized score based on their similarity. These are simply examples yet the design allows for UDFs that support any combination of the DBMS datatypes. For example, some measures may deal with dates, numbers, CLOBs (character large objects), and BLOBs (binary large objects). With these functions registered as defined, the extended SQL may be used to provide a "similarity" score" of how close two records are. For example, the closest match to "BRIAN BAILEY" in the example list of names in the dataset NAMES shown in FIG. 6 may be determined by using the following SQL statement:
 select pkey,name_first,NAMEDIFF(name_first, 'BRIAN') AS score1, name_last, NAMEDIFF (name_last,'BAILY') as score2 from NAMES.

The result of this SQL statement may be represented as the table shown in FIG. 16.

An more conventional exact match search would not have returned any records because there is no "BRIAN BAILY" in the dataset shown in FIG. 6. However, using similarity functions, we have found "BRIAN BAILEY" at record 1242 to be a very close match, with a 100% match on the first name and a 94.9% match on the last name. Note that the inclusion of the name_first column and name_last column in the SQL statement is for example purposes only, and we could have come to the same "scoring" conclusion without them.

Turning to FIG. 17, FIG. 17 shows the results of determining a match between people by including both name and address information in the query. For example, consider an anchor name and address such as:
 BENJAMIN TOBEY living on 740 HUMMING BIRD LANE in KILLEN.

FIG. 17 may result from applying the SQL statement:
 select names.pkey,NAME_DIFF(name_first,'BENJAMIN') AS s1,
  NAME_DIFF(name_last,'TOBEY') AS s2, STREETDIFF(ADDRESS,'740 HUMMING BIRD LANE') AS s3, CITYDIFF(CITY,'KILLEN') AS s4 from names,addresses where names.pkey=addresses.PKEY.

By examining FIG. 17, record 3713 provides the best overall score and, looking back at the dataset shown in FIG. 8, it may be determined that this record belongs to
 BENJAMIN MOBLEY living on 704 HUMMINGBIRD LANE in KILLEEN, which is a close match to the anchor search criteria of
 BENJAMIN TOBEY living on 740 HUMMING BIRD LANE in KILLEN.

The examples above have illustrated UDFs that compare two values and return a floating-point similarity score. The present invention also allow for UDFs that take in multiple attributes and generates a score for all those attributes. Consider the following UDF DDL:
 DECLARE EXTERNAL FUNCTION WHOLENAME CSTRING(255), CSTRING(255), CSTRING(255), CSTRING(255)
 RETURNS FLOAT BY VALUE
 ENTRY_POINT 'whole_name' MODULE_NAME 'MyFunctions';

This UDF compares both first and last names, then returns a score. Here the measure can understand the nuances between swapped first and last names and try several combinations to come up with the best score. The following is an example SQL statement that calls the UDF above, which invokes a similarity comparison based on the whole name:
 select pkey,WHOLENAME(name_first,name_last, 'JOHN', 'RIPLEY') FROM names.

The more domain-specific a UDF is, the more likely the UDF will use multiple dependent attributes to produce a combined score.

A UDF can also be used to restrict the results based on a similarity score. For example, suppose a client wishes to return those records where the first name is "pretty close to JOHN". Using the following SQL statement, the similarity UDF could be used to filter the returned records to meet the search criteria.
 select pkey,name_first, name_middle, name_last FROM NAMES where NAMEDIFF(name_first,'JOHN') >0.90.

This SQL statement may produce the result set shown in FIG. 18. Any combination of UDFs used for scoring and restriction is allowable within the scope of the present invention.
 Consider the following SQL statement:
 select pkey, NAMEDIFF(name_first, 'JOHN'), NAMEDIFF (name_last,'SMITH') FROM NAMES where NAMEDIFF(name_first,'JOHN')>0.90.

It would produce a result similar to the example shown in FIG. 19, where only names having a similarity score of greater than 90 percent are returned from the query.

Similarity UDFs can be also used for sorting result sets. To sort a result set based on the person's last_name as compared to "RIGLEY", consider the following SQL statement:
 select pkey,name_first, name_middle, name_last, FROM NAMES ORDER BY STRDIFF(NAME_LAST,'RIGLEY').

This SQL statement may result in the example shown in FIG. 20.

An important feature of UDFs is that they can be used where the return type of the UDF can be used in this case a float. This allows for restricting, sorting, or grouping based on similarity score as well as in any numerical calculation. In the above examples, observation of the records indicates which of the records has the highest score. But in order to calculate the overall score, there can be many solutions to come up with the best overall score. One of the simplest method of forming an overall score is to divide the sum of the score by the number of attributes that make up the score. In the case of our "BRIAN BAILY" example discussed above with reference to FIG. 16 and FIG. 17, the total score would be (1+0.949)/2=0.975.

In some cases, a user may want to place emphasis on a particular attribute's score as it may play a greater role in the overall score. In the "BRIAN BAILY" example, a user may determine that the score of the last_name should play a bigger role in the overall score and therefore want to weight it at ¾ of the overall score. The calculation would then be (1*0.25)+(0.949*0.75)=0.962.

This allows all of the "BAILY"s (and similar values) in the dataset to generate a higher overall score, regardless of first name. Because the results of the SQL statement are returned to the caller (client), any client-side processing of the results to determine the overall score is acceptable within the scope of the present invention. Average and Weighted Average are simply the most common implementations.

In the client-side overall scoring solution, every record must be returned to the client in order for the client to determine the overall score. This may introduce excessive network traffic and database input and output. One solution would be to use standard SQL arithmetic to generate the necessary result set. In the case of the AVERAGE solution, the generated SQL statement for the case of two attributes may look like the following:

select pkey, (NAMEDIFF(name_first,'BRIAN')+NAMEDIFF(name_last,'BAILY'))/2 AS OVERALL FROM NAMES.

In a more general case, the SQL statement may look like the following:

select pkey, ((UDF$_1$)+ . . . +(UDF$_n$))/n AS OVERALL FROM NAMES.

The result set may look like the example shown in FIG. 21, where "BRIAN BAILEY" at record 1242 provides the highest score.

In the case of weighted average, dynamically generating the query based on weights for each attribute may look like the following SQL statement for the case of two attributes:

select pkey, (NAMEDIFF(name_first,'BRIAN')*0.25)+ (NAMEDIFF(name_last,'BAILY')*0.75) AS OVERALL from names.

In a more general case, an SQL statement may resemble the following:

select pkey, ((UDF$_1$*weight)+ . . . +(UDF$_n$*weight)) AS OVERALL FROM NAMES.

The result set may look like the example shown in FIG. 22.

Average and Weighted Average are fairly simple to implement using standard SQL based arithmetic. However, a more complex overall scoring method may not be able to be expressed in SQL. A solution to this problem is to place the overall scoring logic on the RDBMS itself via the use of UDFs. Instead of the UDFs producing a score by computing the distance/similarity of two values, the UDF produces a score by taking in a series of other scores and generating an overall score. For example, consider a UDF that computes the highest of two scores. It may be defined to database via the following DDL:

DECLARE EXTERNAL FUNCTION TOP2
    FLOAT, FLOAT
    RETURNS FLOAT BY VALUE
    ENTRY_POINT 'highest_two' MODULE_NAME 'MyFunctions';

Since our similarity UDFs return floats already, we could pass in the result of two similarity UDF calls into this new overall scoring UDF to produce an overall result. For example, again looking for "BRIAN BAILY" discussed above. The following SQL statement select pkey, TOP2(name_first,NAMEDIFF(name_first, 'BRIAN'), NAMEDIFF(name_last,'BAILY')) AS OVERALL from NAMES may a result set with a list of PKEYs along with the higher of the first and last name scores.

Generally speaking, the majority of time required in accessing a database is the time required to get data from disk into memory. As a performance optimization technique, it is therefore beneficial to do as much work as possible while the data exists in memory. In the above examples, with the exception of restriction, the database iterates through all the records (or rows), producing a score for each record in the database. The score is generated by comparing the anchor values in the current record with the target values from a search record, and combining the individual scores into an overall score. Assuming that getting the database record into memory is the slowest part of the operation, it is desirable to maximize the number of operations performed on that data before the database and operating system swap the record back out to disk. The goal then is to score as many search records against the current records while the current record is still in memory. For example, assume a dataset of last_names, and also a high volume of requests for queries of this data set. Further assume that at any given time, there are 5 distinct queries of the dataset. Without search coalescing, we would issue the following five separate SQL queries to satisfy the search requests.

select pkey, NAMEDIFF(name_last, 'RIPLEY') from names
    select pkey, NAMEDIFF(name_last, 'BARR') from names
    select pkey, NAMEDIFF(name_last, 'ANANTHA') from names
    select pkey, NAMEDIFF(name_last, 'MOON') from names
    select pkey, NAMEDIFF(name_last, 'SHULTZ') from names Each one of these queries would require a full traversal of the names table, each pass loading each record separately from the rest. If loading the record from disk to memory is the slowest part of the operation, which it generally is, each one of these statements will compound the problem. As an alternative, if there are always have 5 requests waiting, one SQL statement could be issued to generate all the scores in one pass of the data, thereby maximizing the amount of work done once the record is loaded into memory. The following SQL statement may generate a result set like the example shown in FIG. 23, where for every record loaded into memory, five scores may be determined rather than one score:

select pkey, NAMEDIFF(name_last, 'RIPLEY'), NAMEDIFF(name_last, 'BARR'), NAMEDIFF(name_last, 'ANANTHA'), NAMEDIFF(name_last, 'MOON'), NAMEDIFF(name_last, 'SHULTZ') from names.

Turning now to FIG. 24A and FIG. 24B, FIG. 24A and FIG. 24B describe the Measures implemented as UDFs in an embodiment of the SSE. The term "tokenized Compare" is used in the Measure descriptions of FIG. 24A and FIG. 24B. In the present context, it means to use domain-specific (and thus domain-limited) knowledge to break the input strings into their constituent parts. For example, a street address can be broken down into Number, Street Name, Street Type, and, optionally, Apartment. This may improve the quality of scoring by allowing different weights for different token, and by allowing different, more specific measures to be used on each token.

Figure 25:
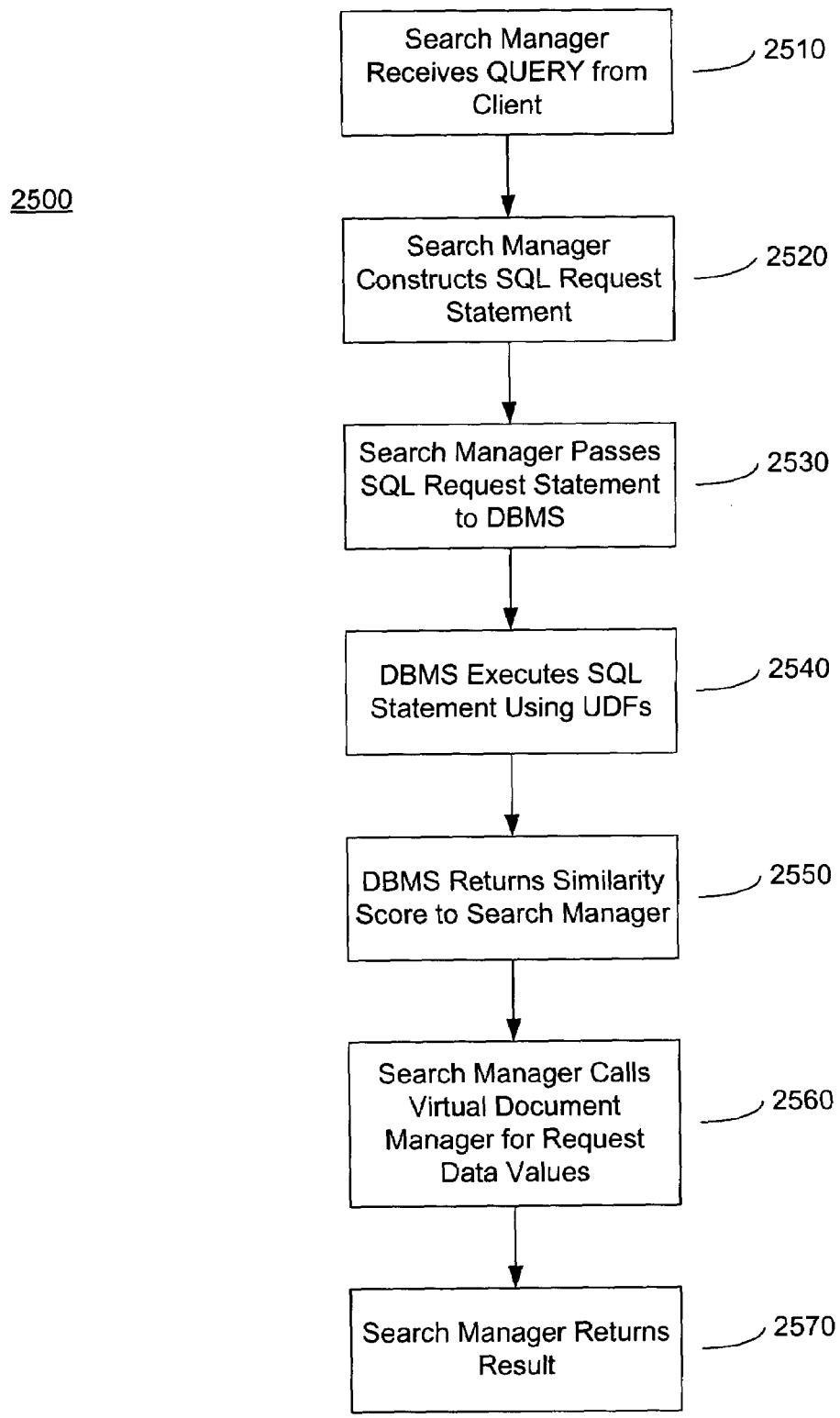
FIG. 25 depicts a process for remotely scoring and aggregating by a Similarity Search Engine.

Turning now to FIG. 25, FIG. 25 depicts a process 2500 for remotely scoring and aggregating by a Similarity Search Engine (SSE). The process of remote similarity scoring and aggregating takes place in seven main steps. An SSE receives a client's request 2510 for a similarity search as a QUERY command that includes a WHERE-clause containing the anchor values for the search. The weights to be used in combining the scores for the various values are either given in the request APPLY clause or obtained from the specified schema for the search. The anchor values needed for the search are provided in the request. The Search Manager then constructs an SQL statement 2520, which includes the weights. However, the weights need to be normalized such that the normalized weight for each search value represents its relative contribution to the overall score and that all the normalize weights add up to 1.00.

To normalize the weights, the weights are first normalized within their repeating groups such that the sum is 1.00, using the following formula:

$$\hat{w} = w/(w1 + w2 + \ldots + wn)$$

where

| | |
|---|---|
| $\hat{w}$ | is the partially normalized weight |
| w | is the raw weight |
| n | is the number of values in the repeating group |
| wi | is the raw weight of the i-th value out of n |

Next, repeating group weights are normalized so that the sum of the weights of all the elements (values and child groups) is 1.00, using the following formula:

$$\hat{g} = g/((g1 + g2 + \ldots + gn) + (\hat{w}1 + \hat{w}2 + \ldots + \hat{w}n))$$

where

| | |
|---|---|
| $\hat{g}$ | is the normalized weight for the group |
| g | is the raw weight for the group |
| gi | is the raw weight for the i-th group under the same parent |
| $\hat{w}j$ | is the partially normalized weight of the j-th value under the same parent |

Finally, repeating group values are 'rolled down' to produce a fully normalized weight for each individual anchor value, using the following formula:

$$W = (\hat{g}1 * \hat{g}2 * \ldots * \hat{g}n) * \hat{w}$$

where

| | |
|---|---|
| W | is the fully normalized weight for the anchor value |
| $\hat{g}i$ | is the normalized weight for the i-th level group containing the value |
| $\hat{w}$ | is the partially normalized weight for the anchor value |

Once the normalized weights have been calculated, the Search Manager inserts them into an SQL statement 2520, which has the following format:

select pkey, (M1(a1,t1)*W1)+(M2(a2,t2)*W2)+ . . . +(Mn (an,tn)*Wn) as SCORE from TABLE order by SCORE descending, where pkey is the primary key for the document being scored;

| | |
|---|---|
| Mi | is the UDF that implements the similarity measure for the i-th value; |
| aj | is the j-th anchor value specified in the request; |
| tj | is the field (column) in TABLE that is mapped to the j-th anchor value and contains the target values for the search; and |
| Wj | is the fully normalized weight associated with the j-th anchor value. |

After constructing an SQL request statement 2520, the Search Manager presents the SQL statement to the DBMS 2530. One method of connecting to the DBMS is the Java Database Connection (JDBC) protocol, which encapsulates the SQL statement as a text string within a connection object that provides the necessary access controls for the DBMS. The connection is synchronous, so the connection is maintained until the Search Manager receives the result from the DBMS. The DBMS then executes the received SQL statement 2540. As described above, the SSE's similarity measures are implemented in the DBMS as User Defined Functions (UDFs). These are represented as M1, M2, . . . , Mn in the SQL statement shown above. The input parameters passed to the measure UDF are the anchor value and target field that contains the target values to be scored. The normalized weights W1, W2 . . . Wn are treated as constants, so once the UDF results are available, the overall score can be calculated as a simple weighted sum:

$$S = s1 * W1 + s2 * W2 + \ldots + sn * Wn$$

where

| | |
|---|---|
| S | is the value to be returned as SCORE |
| si | is the score returned by the UDF call Mi(ai, ti) |
| Wi | is the normalized weight for anchor value ai |

The "order by" clause in the SQL statement tells the DBMS to sort the results in descending order by SCORE so that the documents with the highest similarity scores appear first in the result set.

The DBMS completes the transaction by returning a result set to the Search Manager 2550, consisting of a list of key values and scores. The key value identifies the document to which the corresponding score pertains. When the SQL command has completed by the DBMS, depending on the QUERY, the Search Manager may have some additional steps to perform. These are unrelated to the remote scoring, but are noted here for completeness. If the QUERY command includes a RESTRICT clause, then the client does not wish to receive scores for every document in the database but is interested in only a certain number of scores or the scores within a given range. In these cases, the Search Manager truncates the result set so that only the requested scored are returned. The ordering of scores in descending order facilitates this process and allows the Search Manager to stop processing the result set when it sees that there will be no more scores that meet the restriction. If the QUERY command includes a SELECT clause, then the client wishes to receive the target values considered by the measure along with the score for the comparison. For such requests, the Search Manager calls the Virtual Document Manager (VDM) to obtain the corresponding values 2560, using the document key included in the result set. Finally, the Search Manager packages the document keys, similarity scores, and other requested data as a result set and returns it to the client making the request 2570. This completes the transaction.

Turning now to FIG. 26 and FIG. 27, the architecture of the similarity search engine includes a DATASOURCE object that encapsulates the transport-level protocols used in the connection. FIG. 26 shows a DATASOURCE. The DRIVER element within the DATASOURCE specifies the protocol driver for the connection.

The administrative utility for the similarity search engine allows the protocol driver to be selected at the time the connection to the database is established. One of these "pluggable" drivers implements the industry-standard Secure Sockets Layer or SSL protocol for the connection. SSL is also known as Transport Layer Security or TLS. Because it is based on Public Key Infrastructure or PKI, SSL requires an additional server to act as the Certificate Authority. FIG. 27 shows an example DATASOURCE specifying an SSL driver for DB2.

Turning now to FIGS. 28 through 38, persistence is implemented in a collection of drivers that may be configured to suit the needs of the user. The primary drivers are the Filesystem Driver and the Database Driver, providing filesystem persistence and database persistence, respectively. In the current implementation, the filesystem persistence driver has the path name:

com.infoglide.persistence.drivers.FilesystemDriver

In the current implementation, the database persistence driver has the path name:

com.infoglide.persistence.drivers.DBDriver

A persistence driver is invoked by including a PERSISTENCE element in the configuration file to be persisted. PERSISTENCE elements for filesystem persistence and database persistence are given in FIG. 28 and FIG. 29, respectively. The filesystem PERSISTENCE element contains a LOCATION element indicating the directory node in the filesystem where persisted files are to reside. FIG. 30 shows an example implementation.

The database PERSISTENCE element contains URL, DRIVER, USERNAME, PASSWORD, and TABLE elements indicating the location of the database table where the persisted files are to reside. FIG. 31 shows an example implementation. The table is created with columns for PATH and VALUE, where PATH contains the pathname of the persisted file and VALUE contains the contents of the file represented as an XML text string.

Figures 34, 35:
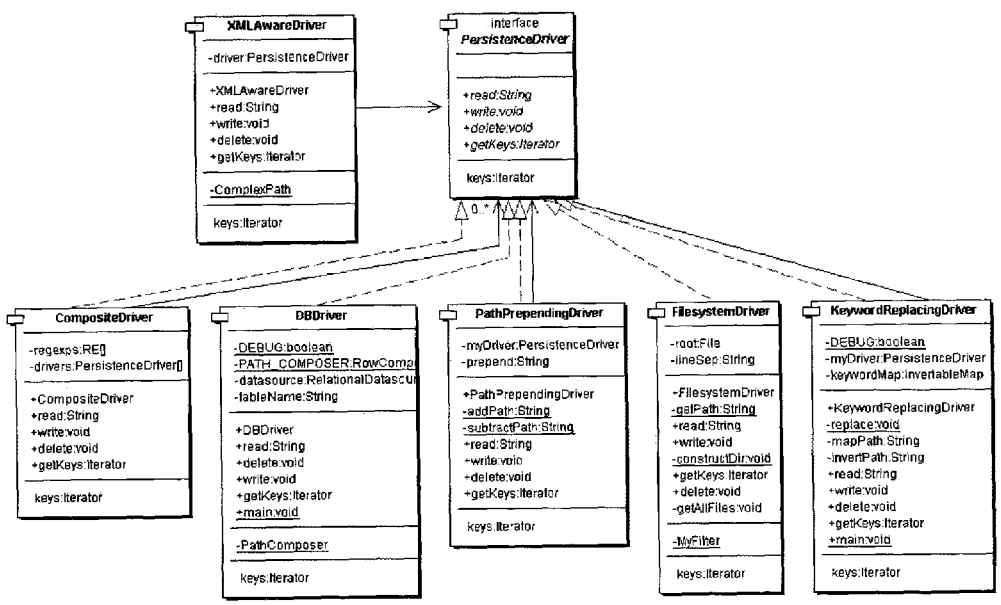
FIG. 34 shows an example of a keyword mapping PERSISTENCE element.
FIG. 35 is a class diagram showing the PERSISTENCE drivers.

Some supporting drivers are also included. The composite persistence driver (FIG. 32) binds one or more of the primary drivers with a regular expression defining their domains of control. The path prepending driver (FIG. 33) is used to construct virtual keys from physical keys by prepending a logical path to the physical keys referenced by the inner primary driver. A keyword replacing driver (FIG. 34) is also employed to perform required keyword substitutions. FIG. 35 is a class diagram showing the drivers described above.

Example invocations of the persistence drivers for the configuration files for the command manager, search manager, and virtual document manager are shown in FIG. 36, FIG. 37, and FIG. 38, respectively. FIG. 36 is an example invocation of the persistence drivers for rersisting the command manager configuration files for the gateway, which includes a username value, a template value and a datasource driver designation. FIG. 37 is an example invocation of the persistence drivers for persisting the search manager configuration files, which includes a measure value, a choice value, a parser value, a datasource value, a schema value, a statistic value, and a datasource driver designation. FIG. 38 is an example invocation of the persistence drivers for persisting the virtual document manager configuration files, which indudes a datatype value, a datasource value, a schema value, and a datasource driver designation. The template value shown in FIG. 34. and FIG. 36 is a mechanism for designating a particular template to be used with a particular driver for keyword substitution of virtual keys.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for performing similarity searching by remote scoring and aggregating, comprising the steps of:

persisting user defined functions and configuration files for a similarity search server in one or more remote database management systems;

receiving a request by the similarity search server from one or more clients for initiating a similarity search, the request designating an anchor document and at least one search document;

generating one or more commands by the similarity search server from the client request;

sending the one or more commands from the similarity search server to the one or more remote database management systems;

executing the one or more commands in the one or more remote database management systems to determine normalized document similarity scores using the persisted user defined functions and configuration files in the remote database management systems;

determining normalized document similarity scores in the remote database management systems using choice algorithms, the choice algorithms using weighting functions applied to results of measure algorithms that determine document leaf node attribute similarity scores;

generating a search result by aggregating the similarity scores from the one or more remote database management systems; and sending the search result to the search server for transmittal to the one or more clients.

2. The method of claim 1, wherein the step of executing one or more commands comprises identifying a persisted schema document for defining a structure of search terms, providing persisted target search values, and designating persisted measure, choice and weight algorithms to be used to determine normalized document similarity scores.

3. The method of claim 1, wherein the step of executing the one or more commands further comprises using persisted user defined functions contained within libraries of the database management systems for implementing measure algorithms to determine attribute similarity scores, weighting functions and choice algorithms for determining normalized document similarity scores.

4. The method of claim 1, wherein the step of executing the one or more commands further comprises:
computing attribute token similarity scores having values of between 0.00 and 1.00 for the corresponding leaf nodes of the anchor document and a search document using designated persisted measure algorithms;
multiplying each token similarity score by a designated persisted weighting function; and
aggregating the token similarity scores using designated persisted choice algorithms for determining a document similarity score having a normalized value of between 0.00 and 1.00 for the at least one search document.

5. The method of claim 1, wherein the step of generating a search result further comprises designating a persisted structure to be used by a result dataset, and imposing persisted restrictions on the result dataset.

6. The method of claim 1, wherein the step of receiving a request comprises:
designating measures that override persisted measures for determining attribute token similarity scores;
designating choice algorithms that override persisted choice algorithms for aggregating token similarity scores into document similarity scores; and
designating weights that override persisted weights to be applied to token similarity scores.

7. The method of claim 1 wherein the step of generating a search result further comprises structuring the similarity scores by imposing restrictions on the similarity scores according to a designated persisted user defined function.

8. The method of claim 7, wherein the step of imposing restrictions is selected from the group consisting of defining a range of similarity scores to be selected and defining a range of percentiles of similarity scores to be selected.

9. The method of claim 1, wherein the step generating a search result further comprises sorting the similarity scores according to a designated persisted user defined function.

10. The method of claim 1 wherein the step of generating a search result further comprises grouping the similarity scores according to a designated persisted user defined function.

11. The method of claim 1 wherein the step of generating a search result further comprises executing statistics commands according to a designated persisted user defined function.

12. The method of claim 1, wherein the step of executing the one or more commands to determine normalized document similarity scores further comprises computing a normalized similarity score having a value of between 0.00 and 1.00, whereby a normalized similarity indicia value of 0.00 represents no similarity matching, a value of 1.00 represents exact similarity matching, and values between 0.00 and 1.00 represent degrees of similarity matching.

13. The method of claim 1, wherein the step of sending the one or more commands further comprises invoking an instance of a datasource object for implementing an interface for the datasource, the datasource object comprising a name, a uniform resource locator, a username, a password and a protocol driver designation.

14. The method of claim 13, wherein the protocol driver designation is a Secure Sockets Layer.

15. The method of claim 1, further comprising the step of establishing a secure connection between the similarity search server and the one or more remote database management systems.

16. The method of claim 1, wherein the step of persisting configuration files for a similarity search server comprises persisting configuration files for a gateway, a virtual document manager and a search manager.

17. The method of claim 16, wherein the step of persisting configuration files for the gateway comprises persisting a username value, a template value and datasource driver.

18. The method of claim 16, wherein the step of persisting configuration files for the virtual document manager comprises persisting a datatype value, a datasource value, a schema value, and a datasource driver.

19. The method of claim 16, wherein the step of persisting configuration files for the search manager comprises persisting a measure value, a choice value, a parser value, a datasource value, a schema value, a statistic value, and a datasource driver.

20. The method of claim 1, wherein the step of executing the one or more commands in the one or more database management systems comprises executing one coalesced search command to generate all similarity scores of multiple search documents for maximizing the processing once records have been loaded into memory and minimizing the number of disk accesses required.

21. The method of claim 1, wherein the step of executing the one or more commands in the one or more database management systems comprises executing commands in multiple database management systems for increased performance, each database management system containing a partition of a total target database to be searched.

22. The method of claim 21, further comprising the step of horizontally partitioning the total target database to be searched among the multiple database management systems.

23. The method of claim 21, further comprising the step of vertically partitioning the total target database to be searched among the multiple database management systems.

24. The method of claim 21, further comprising the step of horizontally and vertically partitioning the total target database to be searched among the multiple database management systems.

25. The method of claim 1, further comprising the step of selecting user defined functions for measure algorithms from the group consisting of name equivalents, foreign name equivalents, textual, sound coding, string difference, numeric, numbered difference, ranges, numeric combinations, range combinations, fuzzy, date oriented, date to range, date difference, and date combination.

26. The method of claim 1, further comprising the step of selecting user defined functions for choice algorithms from the group consisting of single best, greedy sum, overall sum, greedy minimum, overall minimum, and overall maximum.

27. A computer-readable medium containing instructions for controlling a computer system to implement the method of claim 1.

28. A system for performing similarity searching by remote scoring and aggregating, comprising:
means for persisting user defined functions and configuration files for a similarity search server in one or more remote database management systems;
means for receiving a request by the similarity search server from one or more clients for initiating a similarity search, the request designating an anchor document and at least one search document;

means for generating one or more commands by the similarity search server from the client request;

means for sending the one or more commands from the similarity search server to the one or more remote database management systems;

means for executing the one or more commands in the one or more remote database management systems to determine normalized document similarity scores using the persisted user defined functions and configuration files in the remote database management system;

means for determining normalized document similarity scores in the remote database management systems using choice algorithms, the choice algorithms using weighting functions applied to results of measure algorithms that determine document leaf node attribute similarity scores;

means for generating a search result by aggregating the similarity scores from the one or more remote database management systems; and means for sending the search result to the search server for transmittal to the one or more clients.

29. The system of claim 28, wherein the means for receiving a request by the similarity search server is a gateway connected to a client network, the gateway also connecting to a search manager and a virtual document manager.

30. The system of claim 28, wherein the means for generating one or more commands by the similarity search server is a search manager connected between a gateway and a database network interface.

31. The system of claim 28, wherein the means for sending the one or more commands from the similarity search server to one or more remote database management systems is a database network interface connected to a secure database network, the secure database network connecting to the database management systems.

32. The system of claim 28, wherein the means for executing the one or more commands is the remote database management systems, the remote database management systems including a library of user defined functions.

33. The system of claim 28, wherein the means for sending the search results is the remote database management systems connected to a secure database network, the secure database network connecting to a database network interface of the similarity search server.

34. The system of claim 28, wherein the configuration files for the similarity search server comprises configuration files for the gateway, the virtual document manager and the search manager.

35. The system of claim 28, wherein the means for persisting user defined functions and configuration files comprises file system persistence drivers and database persistence drivers.

36. The system of claim 28, wherein the means for sending the one or more commands and the means for sending the search results is a persistence driver based on a Secure Sockets Layer protocol.

37. The system of claim 28, wherein the means for executing the one or more commands in the one or more remote database management systems comprises one coalesced SQL search command to generate all similarity scores of multiple search documents for maximizing the processing once records have been loaded into memory and minimizing the number of disk accesses required.

38. The system of claim 28, wherein the means for executing the one or more commands comprises means for executing commands in multiple remote database management systems for increased performance, each remote database management system containing a partition of a total target database to be searched.

39. The system of claim 38, further comprising means for horizontally partitioning the total target database to be searched among the multiple database management systems.

40. The system of claim 38, further comprising means for vertically partitioning the total target database to be searched among the multiple database management systems.

41. The system of claim 38, further comprising means for horizontally and vertically partitioning the total target database to be searched among the multiple database management systems.

42. The system of claim 28, wherein the user defined function for a measure algorithm is selected from the group consisting of name equivalents, foreign name equivalents, textual, sound coding, string difference, numeric, numbered difference, ranges, numeric combinations, range combinations, fuzzy, date oriented, date to range, date difference, and date combination.

43. The system of claim 28, wherein the user defined function for a choice algorithm is selected from the group consisting of single best, greedy sum, overall sum, greedy minimum, overall minimum, and overall maximum.

44. The system of claim 24, wherein:

the means for sending the one or more commands from the similarity search server to one or more remote database management systems is via a secure database network connection; and the means for sending the search results to the search is via a secure database network connection.

45. A system for performing similarity searching by remote scoring and aggregating, comprising:

user defined functions and configuration files for a similarity search server persisted in one or more remote database management systems;

one or more clients communicating with a similarity search server for requesting a similarity search between an anchor document and at least one search document;

the similarity search server processing the similarity search request and constructing one or more commands from the similarity search request;

the similarity search server communicating with one or more remote database management systems for transmitting the one or more commands;

the one or more remote database management systems executing the one or more commands to obtain a similarity search result comprising a normalized document similarity score using persisted user defined functions and configuration files in the remote database management systems;

the normalized document similarity scores in the remote database management systems determined using choice algorithms, the choice algorithms using weighting functions applied to results of measure algorithms that determine document leaf node attribute similarity scores;

the one or more database management systems generating a search result by aggregating the similarity scores from the one or more remote database management systems and communicating with the similarity search server for transmitting the search result; and the similarity search server processing the similarity search result and communicating with the one or more clients for transmitting a similarity search response to the one or more clients.

46. The system of claim 45, further comprising a secure client network connection for transmitting a similarity search request and similarity search response between the one or more clients and the similarity search server.

47. The system of claim 45, further comprising a secure database network connection for transmitting the one or more commands and the search results between the one or more remote database management systems and the similarity search server.

\* \* \* \* \*